US009234991B2

(12) United States Patent
Foland et al.

(10) Patent No.: US 9,234,991 B2
(45) Date of Patent: Jan. 12, 2016

(54) HIGHLY COMPLIANT RESONANT DIFFRACTION GRATINGS, AND METHODS AND USE THEREOF

(71) Applicant: Board of Regents, The University of Texas System, Austin, TX (US)

(72) Inventors: Steven John Foland, Dallas, TX (US); Jeong Bong Lee, Plano, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 526 days.

(21) Appl. No.: 13/656,051

(22) Filed: Oct. 19, 2012

(65) Prior Publication Data

US 2013/0279004 A1      Oct. 24, 2013

Related U.S. Application Data

(60) Provisional application No. 61/549,385, filed on Oct. 20, 2011.

(51) Int. Cl.
    *G02B 6/10*    (2006.01)
    *G02B 5/18*    (2006.01)
(52) U.S. Cl.
    CPC ............ *G02B 5/1809* (2013.01); *G02B 5/1861* (2013.01)
(58) Field of Classification Search
    None
    See application file for complete search history.

(56) References Cited

U.S. PATENT DOCUMENTS

| 5,144,690 | A | * | 9/1992 | Domash | 385/12 |
| 5,864,641 | A | * | 1/1999 | Murphy | G01N 21/774 |
| | | | | | 250/227.14 |
| 2006/0193550 | A1 | * | 8/2006 | Wawro | C01N 21/648 |
| | | | | | 385/12 |
| 2007/0252998 | A1 | * | 11/2007 | Berthold et al. | 356/450 |
| 2007/0279745 | A1 | * | 12/2007 | Klemann | 359/566 |
| 2010/0080502 | A1 | * | 4/2010 | Nishikawa et al. | 385/12 |
| 2013/0077170 | A1 | * | 3/2013 | Ukuda | 359/566 |

OTHER PUBLICATIONS

Baird et al., "Diffraction characteristics of planar absorption gratings," *Appl. Phys. B.*, 32:15-20, 1983.
Baldwin, "Optical fiber strain gages," *Springer Handbook of Experimental Solid Mechanics, Part B*, Chapter 14, pp. 347-370, 2008.
Block et al., "High sensitivity plastic-substrate photonic crystal biosensor," *IEEE Sensors Journal*, 8(9):1546-1547, 2008.
Block et al., "Photonic crystal optical biosensor incorporating structured low-index porous dielectric," *Sensors and Actuators B*, 120:187-193, 2006.

(Continued)

*Primary Examiner* — Andre Allen
(74) *Attorney, Agent, or Firm* — Parker Highlander PLLC

(57) ABSTRACT

Highly-compliant polymer-based resonant diffraction gratings, and methods of use thereof, are provided. In one illustrative embodiment, an amount of pressure applied to a grating surface may be determined by straining a grating, adapted to move into a plurality of pitches, to an applied pitch in the plurality of pitches in response to an application of strain onto a surface adjacent the grating. Electromagnetic radiation comprising a plurality of wavelengths may be applied to the grating, and a resonance wavelength, in the plurality of wavelengths, may be identified while the strain is applied to the grating. The amount of strain applied to the grating surface may then be determined based on the resonant wavelength.

8 Claims, 23 Drawing Sheets

(56) References Cited

OTHER PUBLICATIONS

Cheng et al., "Note: mechanical study of micromachined polydimethylsiloxane elastic microposts," *Rev. Sci. Instrum.*, 81:106104, 2010.

Cheng et al., "Viscoelastic properties of human tympanic membrane," *Annals of Biomedical Engineering*, 35(2):305-314, 2007.

Cho et al., "An ultrasensitive silicon pressure-based microflow sensor," *IEEE Transactions on Electron Devices*, 39(4):825-835, 1992.

Cunningham et al., "Colormetric resonant reflection as a direct biochemical assay technique," *The Fifteenth IEEE International Conference on Micro Electro Mechanical Systems*, pp. 64-68, 2002.

Cunningham et al., "Enhancing the surface sensitivity of colorimetric resonant optical biosensors," *Sensors and Actuators B*, 87:365-370, 2002.

Dobbs, "Fabrication of a graded-wavelength guided-mode resonance filter photonic crystal," *Applied Physics Letters*, 89:123113, 2006.

Foland et al., "High-sensitivity microfluidic pressure sensor using a membrane-embedded resonant optical grating," *Sensors IEEE*, pp. 101-104, 2011.

Foland et al., "One-dimensional nano grating-based guided-mode resonance pressure sensor," *IEEE/ASME Journal of Microelectromechanical Systems*, 21(5):1117-1123, 2012.

Foland et al., "Pressure-tunable guided-mode resonance sensor for single-wavelength characterization," *Optics Letters*, 35 (23);3871-3873, 2010.

Gaylord and Moharam, "Planar dielectric grating diffraction theories," *Applied Physics B*, 28:1-14, 1982.

Gaylord and Moharam, "Thin and thick gratings: terminology clarification," *Applied Optics*, 20:3271-3273, 1981.

Hessel and Oliner, "A new theory of wood's anomalies on optical gratings," *Applied Optics*, 4(10):1275-1297, 1965.

Hosokawa et al., "A polymethylsiloxane (PDMS) deformable diffraction grating for monitoring of local pressure in microfluidic devices," *J. Micromech. Microeng.*, 12:1-6, 2002.

Kikuta et al., "Refractive index sensor with a guided-mode resonant grating filter," *Proceedings of SPIE*, 4416:219-222, 2001.

Kohl et al., "A microfluidic experimental platform with internal pressure measurements," *Sensors and Actuators A.*, 118:212-221, 2005.

Lee et al., "Enhanced light trapping based on guided mode resonance effect for thin-film silicon solar cells with two filling-factor gratings," *Optics Express*, 16(11):7970-7975, 2008.

Lemmon et al., "Shear force at the cell-matrix interface: enhanced analysis for microfabricated post array detectors," *Mech Chem Biosyst.*, 2(1):1-16, 2005.

Liu et al., "Thickness-dependent mechanical properties of polydimethylsiloxane membranes," *J. Micromech. Microeng.*, 19:035028, 2009.

Lötters et al., "The mechanical properties of the rubber elastic polymer polydimethylsiloxane for sensor applications," *J. Micromech. Microeng.*, 7:145-147, 1997.

Magnusson and Ding, "MEMS tunable resonant leaky mode filters," *IEEE Photonics Technology Letters*, 18(14):1479-1481, 2006.

Magnusson and Shokooh-Saremi, "Widely tunable guided-mode resonance nanoelectromechanical RGB pixels," *Optics Express*, 15(17):10903-10910, 2007.

Magnusson and Wang, "New principle for optical filters," *Applied Physics Letters*, 61(9):1022-1024, 1992.

Magnusson et al., "Guided-mode resonance Brewster filter," *Optics Letters*, 23(8):612-614, 1998.

Mateus et al., "Compact label-free biosensor using VCSEL-based measurement system," *IEEE Photonics Technology Letters*, 16(7):1712-1714, 2004.

McEnteggart, "Extensometers," *Springer Handbook of Experimental Solid Mechanics*, Part B, Chapter 13, pp. 335-346, 2008.

Moharam and Gaylord, "Chain-matrix analysis of arbitrary-thickness dielectric reflection gratings," *J. Opt. Soc. Am.*, 72(2):187-190, 1982.

Moharam and Gaylord, "Comments on analyses of reflection gratings," *J. Opt. Soc. Am.*, 73(3):399-401, 1983.

Moharam and Gaylord, "Coupled-wave analysis of reflection gratings," *Applied Optics*, 20(2):240-244, 1981.

Moharam and Gaylord, "Diffraction analysis of dielectric surface-relief gratings," *J. Opt. Soc. Am.*, 72(10):1385-1392, 1982.

Moharam and Gaylord, "Rigorous coupled-wave analysis of planar-grating diffraction," *Journal of the Optical Society of America*, 71(7):811-818, 1981.

Moharam and Gaylord, "Three-dimensional vector coupled-wave analysis of planar-grating diffraction," *J. Opt. Soc. Am.*, 73(9):1105-1112, 1983.

Moharam et al., "Diffraction characteristics of photoresist surface-relief gratings," *Applied Optics*, 23(18):3214-3220, 1984.

Moharam et al., "Formulation for stable and efficient implementation of the rigorous coupled-wave analysis of binary gratings," *J. Opt. Soc. Am. A.*, 12(5):1068-1076, 1995.

Moharam et al., "Stable implementation of the rigorous coupled-wave analysis for surface-relief gratings: enhanced transmittance matrix approach," *J. Opt. Soc. Am. A.*, 12(5):1077-1086, 1995.

Moharam, "Final report—Research initiation: a study of planar dielectric grating couplers," performed for National Science Foundation, Grant No. ESC-8105483, from Jul. 1, 1981 to Dec. 31, 1983.

Moharam, "Rigorous coupled-wave analysis of grating diffraction—E-mode polarization and losses," *J. Opt. Soc. Am.*, 73(4):451-455, 1983.

Motamed et al., "Interaction nonlinearity in asphalt binders," *Mech Time-Depend Mater*, 16:145-167, 2012.

Privorotskaya et al., "Sensing micrometer-scale deformations via stretching of a photonic crystal," *Sensors and Actuators A*, 161:66-71, 2010.

Rife et al., "Design and performance of GMR sensors for the detection of magnetic microbeads in biosensors," *Sensors and Actuators A*, 107(3):209-218, 2003.

Sasoglu et al., "Design and microfabrication of a high-aspect-ratio PDMS microbeam array for parallel nanonewton force measurement and protein printing," *J. Micromech. Microeng.*, 17:623-632, 2007.

Song et al., "Tunable guided-mode resonances in coupled gratings," *Optics Express*, 17(26):23544-23555, 2009.

Wang and Magnusson, "Theory and applications of guided-mode resonance filters," *Applied Optics*, 32(14):2606-2613, 1993.

Wang et al., "Guided-mode resonances in planar dielectric-layer diffraction gratings," *J. Opt. Soc. Am. A.*, 7(8):1470-1474, 1990.

Wang et al., "Polydimethylsiloxane-integratable micropressure sensor for microfluidic chips," *Biomicrofluidics*, 3:034105, 2009.

Watson, "Bonded electrical resistance strain gages," *Springer Handbook of Experimental Solid Mechanics*, Part B, Chapter 12, pp. 283-333, 2008.

Wawro et al., "Optical fiber endface biosensor based on resonances in dielectric waveguide gratings," *Proceedings of SPIE*, 3911:86-94, 2000.

\* cited by examiner

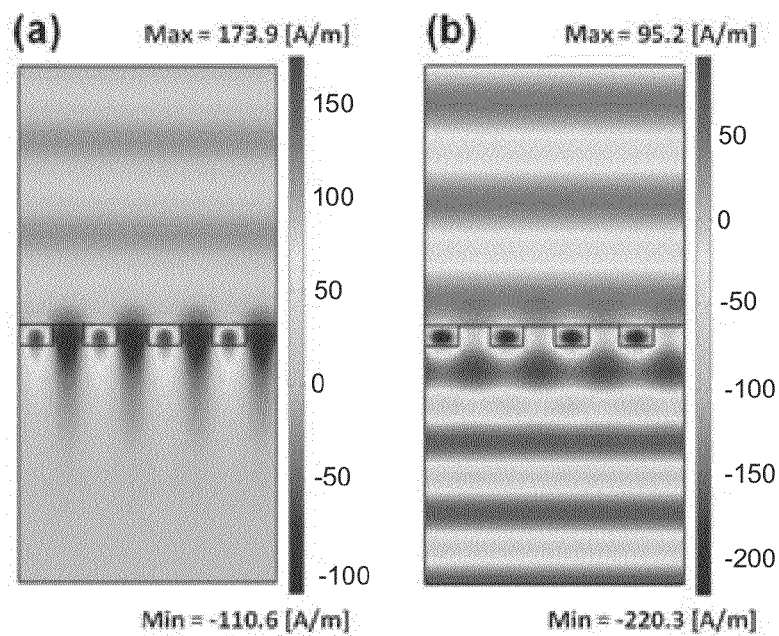
FIG. 18A, B
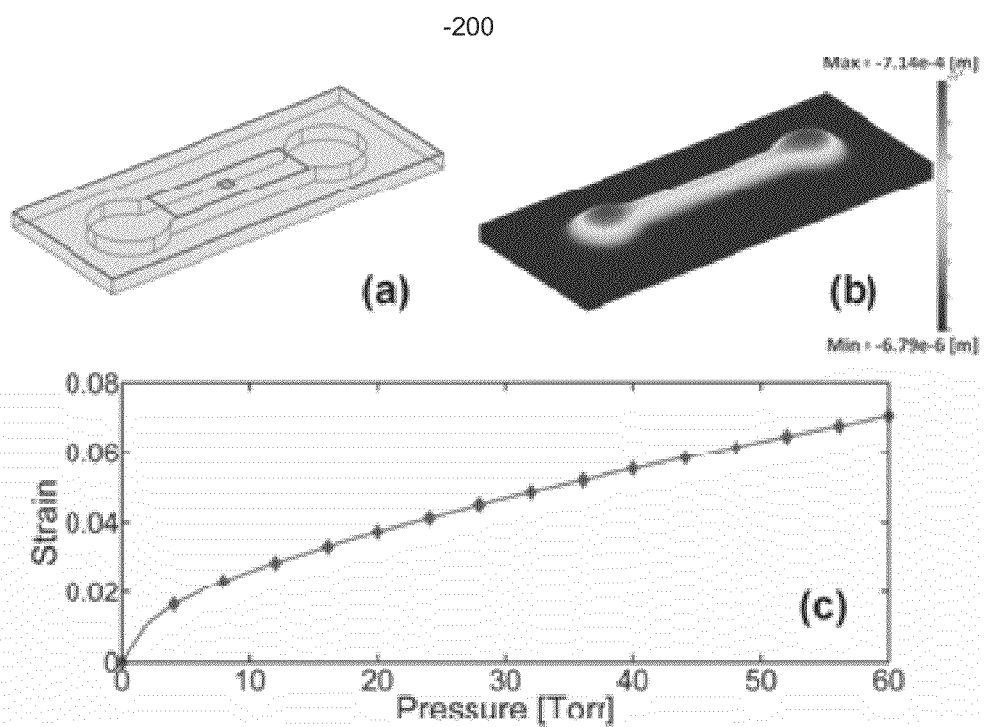
FIG. 19A, B, C

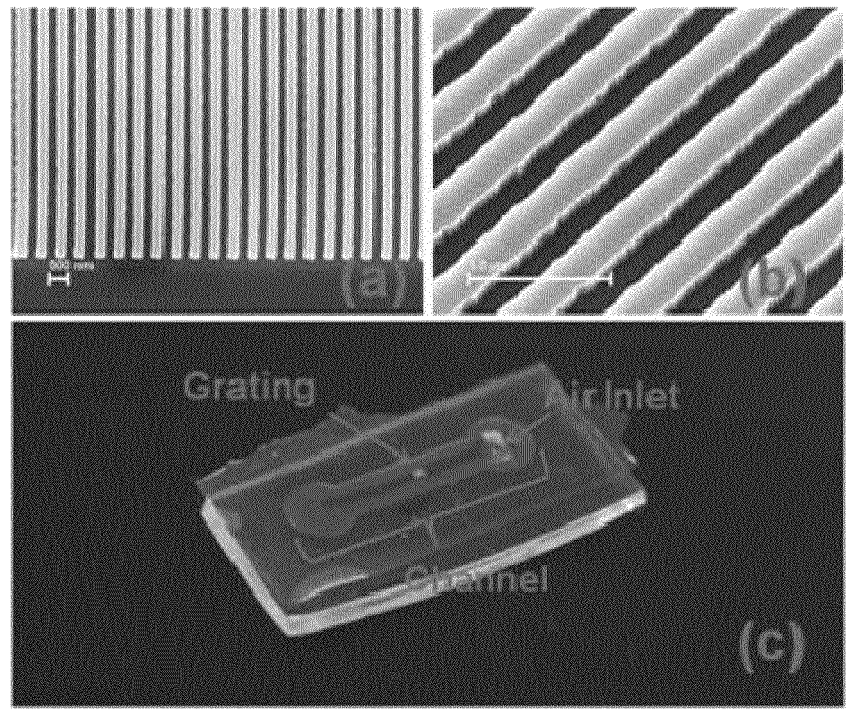
FIG. 22A, B, C
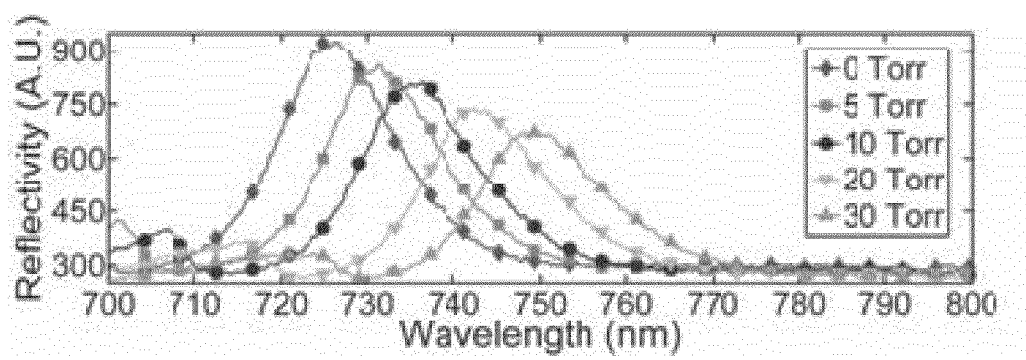
FIG. 23

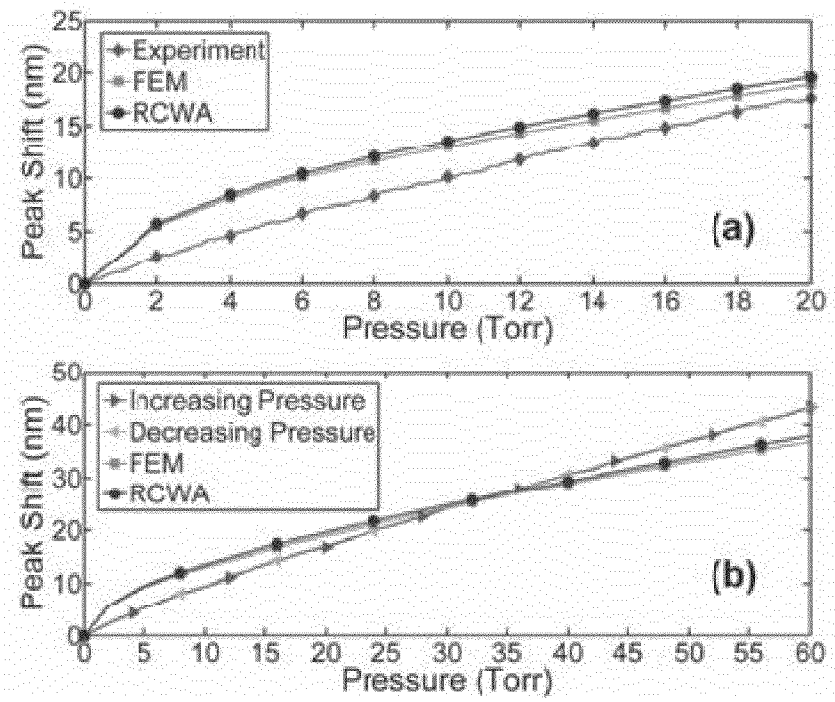
FIG. 24A, B
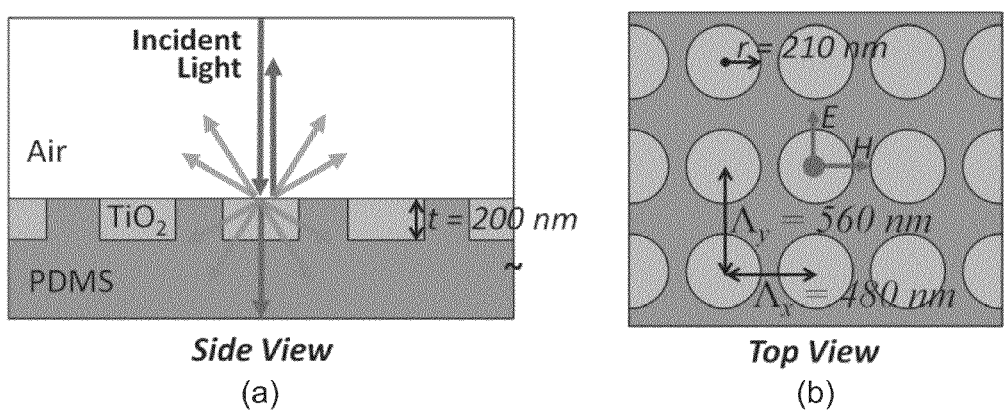
FIG. 25

(a)          (b)

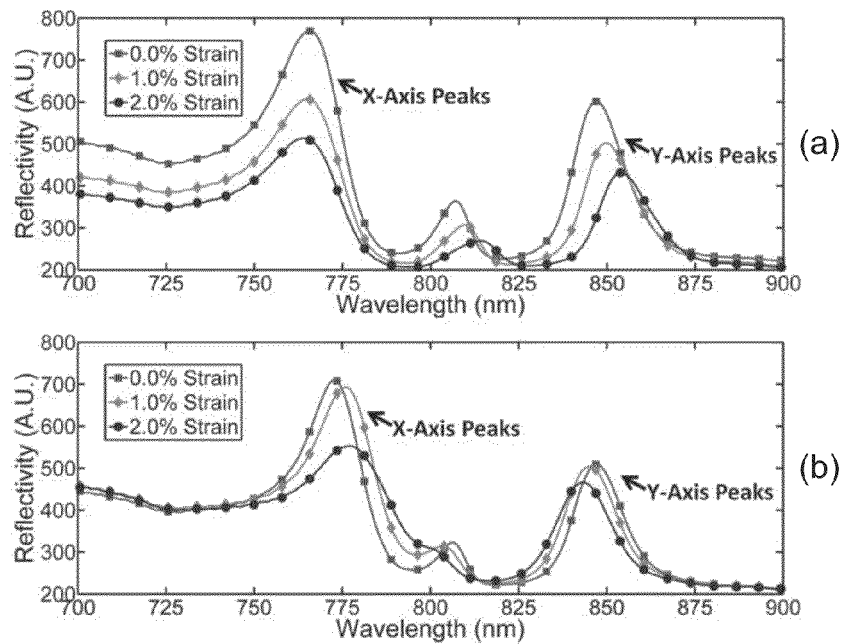
FIG. 30A, B
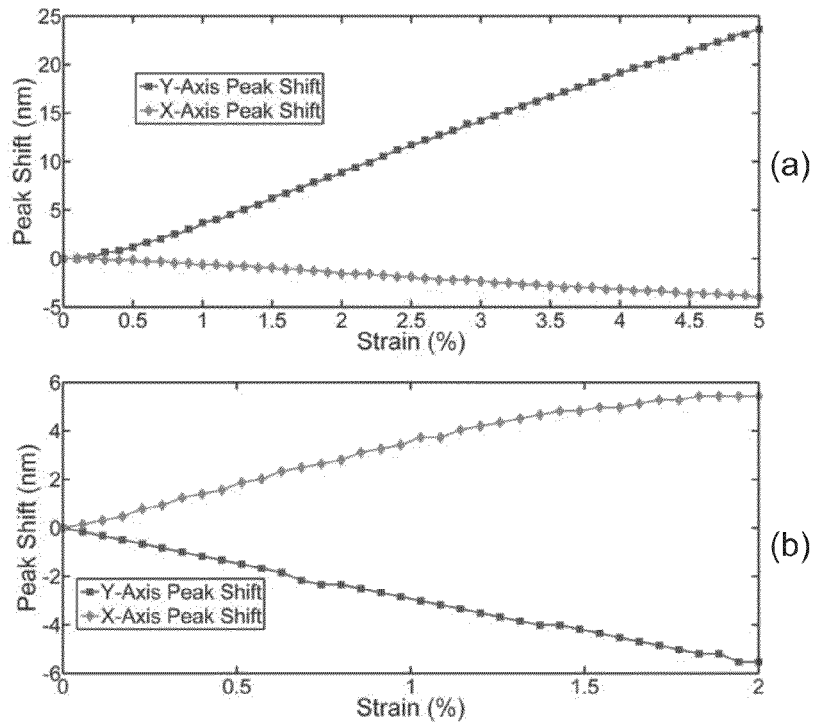
FIG. 31

HIGHLY COMPLIANT RESONANT DIFFRACTION GRATINGS, AND METHODS AND USE THEREOF

CROSS-REFERENCE TO RELATED APPLICATIONS

This application claims the benefit of U.S. Provisional Application No. 61/549,385 filed Oct. 20, 2011, which is hereby incorporated by reference.

TECHNICAL FIELD

The illustrative embodiments relate generally to guided-mode resonance (GMR) diffraction gratings, and more particularly, to highly-compliant polymer-based resonant diffraction gratings, and methods of use thereof.

BACKGROUND

GMR devices are a type of dielectric diffraction grating comprising periodically varying regions of high and low refractive index (RI) materials. At specific wavelengths, these gratings exhibit a strong resonance effect, changing the response to incident light from mostly-transmissive to mostly-reflective. Due to this resonance's sensitivity to the refractive index of surrounding materials, GMR devices have garnered a great deal of attention in recent years for their uses in a wide variety of fields.

SUMMARY

According to an illustrative embodiment, a method includes straining a grating, adapted to move into a plurality of pitches, to an applied pitch in the plurality of pitches in response to an application of strain onto a surface adjacent the grating, applying electromagnetic radiation comprising a plurality of wavelengths to the grating, identifying a resonance wavelength, in the plurality of wavelengths, of the grating while the strain is applied to the grating, and determining an amount of strain applied to the surface adjacent the grating based on the resonance wavelength.

In another illustrative embodiment, a method for determining a parameter of a medium is provided comprising providing a grating strainable into a plurality of pitches, the grating having a test area adjacent a surface of the grating at which a medium is applicable. Electromagnetic radiation having a single wavelength is applied to the grating. A pitch of the grating is varied over a range in the plurality of pitches. An applied pitch in the range of pitches is identified at which the electromagnetic radiation has a peak reflectivity. A parameter of the medium is determined using the applied pitch.

In another illustrative embodiment, a grating is disclosed comprising a low refractive index material and a plurality of regions of high refractive index material embedded in the low refractive index material. The plurality of high refractive index material regions are spaced such that the grating comprises alternating regions of low refractive index material and high refractive index material. The spacing between the high refractive index material regions is adapted to change based on an amount of pressure applied to the grating such that the resonant wavelength of the grating is changeable when pressure is applied to the grating.

In another illustrative embodiment, a method of manufacturing a grating is disclosed comprising providing a silicon wafer, depositing a molybdenum layer on the silicon wafer, depositing a titanium dioxide layer on the molybdenum layer, depositing an aluminum conduction layer on the titanium dioxide layer, patterning the grating in poly(methylmethacrylate) using electron-beam lithography, depositing chromium on the grating pattern, removing excess chromium to form a grating pattern hard mask, transferring the grating pattern to the titanium dioxide layer using dry etching, removing metals from the tops of the titanium dioxide grating pattern using an aluminum wet etchant, spin coating polydimethylsiloxane on the wafer surface to form a membrane, bonding a bulk polydimethylsiloxane structure to the membrane, and etching the molybdenum layer to release the membrane and grating from the silicon wafer.

BRIEF DESCRIPTION OF THE DRAWINGS

FIGS. 18A and 18B illustrate magnetic fields associated with the illuminated grating according to an illustrative embodiment;

FIGS. 19A and 19B illustrates simulation modeling of the entire channel and membrane geometry according to an illustrative embodiment;

FIG. 19C illustrates the lateral strain acting on the grating under applied pressure according to an illustrative embodiment;

FIGS. 22A and 22B illustrate scanning electron microscope (SEM) images of the grating structure prior to release from the substrate according to an illustrative embodiment;

FIG. 22C is a photograph of a completed sensor device according to an illustrative embodiment;

FIG. 23 illustrates resulting reflectance spectra from an exemplary characterization according to an illustrative embodiment;

FIG. 24A illustrates the relative shift in the resonant wavelength as pressure is varied according to an illustrative embodiment;

FIG. 24B shows the sensor's response as applied pressures are slowly increased and decreased over a period of several hours according to an illustrative embodiment;

FIG. 25 illustrates different diffraction and interaction of light along each axis of a grating according to an illustrative embodiment;

FIGS. 30A and 30B illustrate the response of the sensor device's reflectance spectrum when positively strained in the y-axis (long axis), and x-axis (short axis) respectively according to an illustrative embodiment;

FIG. 31 illustrates the relative shifts in the peak wavelengths according to an illustrative embodiment;

DETAILED DESCRIPTION

Figure 1A:
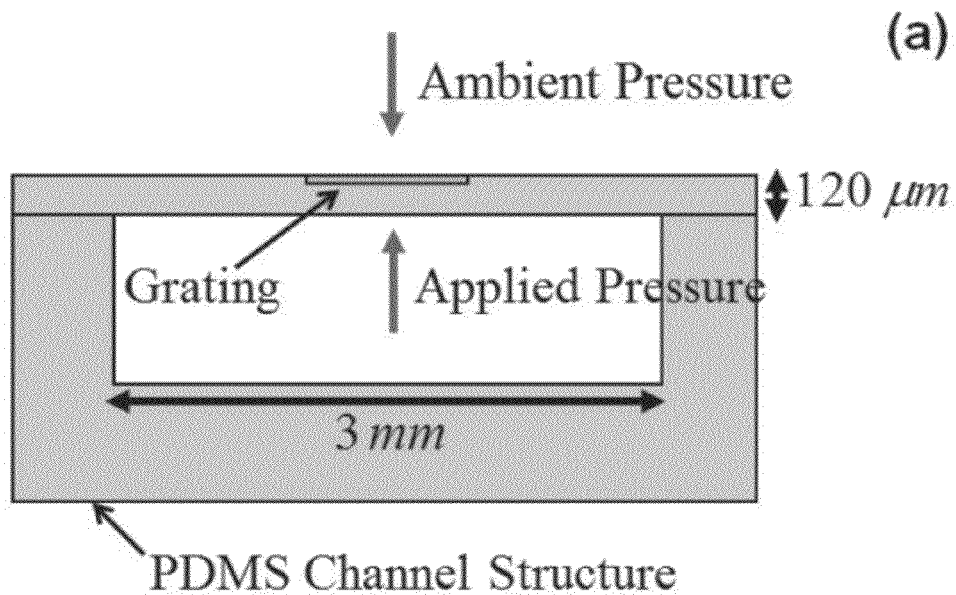
FIG. 1A is a mechanical model schematic diagram of a pressure-tunable guided-mode resonant diffraction grating according to an illustrative embodiment.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid details not necessary to enable those skilled in the art to practice the embodiments described herein, the description may omit certain information known to those skilled in the art. The following detailed description is, therefore, not to be taken in a limiting sense.

The illustrative embodiments disclose one embodiment for determining a pressure comprising straining a grating, adapted to move into a plurality of pitches, to an applied pitch in the plurality of pitches in response to the application of strain onto a surface adjacent the grating, applying electromagnetic radiation comprising a plurality of wavelengths to the grating, identifying a resonance wavelength, in the plurality of wavelengths, of the grating while the strain is applied to the grating, and determining an amount of strain applied to the grating surface based on the resonance wavelength. In a further embodiment, the grating has a first resonance wavelength when the electromagnetic radiation is applied to the grating when the grating is unstrained, wherein determining the amount of strain applied to the grating surface based on the resonance wavelength comprises determining a difference between the first resonance wavelength and the resonance wavelength of the grating while the strain is applied to the grating and determining the amount of strain applied to the grating surface based on the difference. In another embodiment, the identification of the resonance wavelength comprises identifying the wavelength at which the grating exhibits peak reflectivity. In another embodiment, the straining of the grating is caused by an increase in pressure in a cavity adjacent the surface of the grating, and the amount of strain applied to the grating surface is associated with an amount of pressure in the cavity such that determining the amount of strain applied to the grating surface based on the resonance wavelength comprises determining the amount of pressure in the cavity. In another embodiment, the cavity is a microchannel. In another embodiment, the amount of pressure in the microchannel is associated with a flow rate of a fluid in the microchannel, and the determination of the amount of pressure in the cavity comprises determining a flow rate in the microchannel. In another embodiment, the fluid is at least one of a gas or a liquid.

In one embodiment, a method for determining a parameter of a medium is disclosed comprising providing a grating strainable into a plurality of pitches, the grating having a test area adjacent a surface of the grating at which a medium is applicable, applying electromagnetic radiation having a single wavelength to the grating, varying the pitch of the grating over a range in the plurality of pitches, identifying an applied pitch in the range of pitches at which the electromagnetic radiation has a peak reflectivity, and determining a parameter of the medium using the applied pitch. In a further embodiment, varying the pitch of the grating over the range of pitches is performed by varying a pressure applied to the grating, and identifying the applied pitch in the range of pitches at which the electromagnetic radiation has the peak reflectivity comprises identifying the amount of pressure applied to the grating to achieve the applied pitch to form the applied pressure, and determining the parameter of the medium using the applied pitch comprises determining the parameter of the medium based on the applied pressure. In another embodiment, the test area is adjacent a first surface of the grating, and the pressure is applied adjacent a second surface of the grating, the second surface on an opposite side of the grating than the first surface. As used herein, the term "adjacent" does not necessarily require contact, and may include indirect contact or no contact at all. For example, the pressure may be applied "near" the second surface of the grating, and not necessarily directly upon the second surface of the grating. The pressure may also be applied upon a surface or material between the second surface of the grating and the area from which pressure is applied. In another example, the pressure may be applied to a membrane in which the grating is embedded, but on the side of the membrane nearer the second surface of the grating.

In another embodiment, the pressure is applied into a cavity adjacent the second surface of the grating. In another embodiment, the test area has an initial state, an initial pressure applied to the surface of the grating during the initial state to cause the grating to have an initial strain at which the electromagnetic radiation has the peak reflectivity, corresponding to a resonant condition, and the determination of the parameter of the medium based on the applied pressure comprises determining the parameter of the medium based on a difference between the initial pressure and the applied pressure at which peak reflectivity occurs. In another embodiment, the test area has an initial state, and the determination of the parameter of the medium using the applied pitch comprises comparing the applied pitch to an initial pitch in the plurality of pitches to determine the parameter of the medium, the initial pitch being one of the plurality of pitches at which the electromagnetic radiation has a peak reflectivity while the test area is in the initial state. In another embodiment, the surface of the grating comprises one or more binding sites adapted to bind to one or more particles in the medium, and in the initial state, the test area comprises the medium with a plurality of particles unbound to the surface of the grating, and identifying the applied pitch in the range of pitches at which the electromagnetic radiation has the peak reflectivity occurs after a period of time elapses to allow at least a portion of the plurality of particles to bind to the surface of the grating. In another embodiment, in the initial state, the surface of the grating has an initial refractive index, and at least a portion of the plurality of particles bind to the surface of the grating, and the initial refractive index of the surface of the grating changes in response to the plurality of particles binding to the surface of the grating, and the applied pitch differs from the initial pitch as a result of the change in the initial refractive index. In another embodiment, the test area has an initial state, the medium is absent from the test area in the initial state, and the medium is applied to the test area adjacent the surface of the grating, and the identification of the applied pitch in the range of pitches at which the electromagnetic radiation has the peak reflectivity occurs when the medium is at least partially present in the test area. In another embodiment, in the initial state, the surface of the grating has an initial refractive index, and the initial refractive index of the surface of the grating changes in response to the presence of the medium in the test area, and the applied pitch differs from the initial pitch as a result of the change in the initial refractive index. In another embodiment, the first wavelength is substantially a single wavelength of electromagnetic radiation. In another embodiment, the medium is one of a gas or a liquid.

In one embodiment, a grating is disclosed that comprises a low refractive index material, a plurality of regions of high refractive index material embedded in the low refractive index material, the plurality of high refractive index material regions spaced such that the grating comprises alternating regions of low refractive index material and high refractive index material, and the spacing between the high refractive index material regions is adapted to change based on an amount of pressure applied to the grating such that the resonant wavelength of the grating is changeable when pressure is applied to the grating. In a further embodiment, the low refractive index material is polydimethylsiloxane. In another embodiment, the high refractive index material is titanium dioxide. In another embodiment, the high refractive index material regions are substantially bar shaped and parallel to one another, with the bar-shaped high refractive index regions evenly spaced from one another. In another embodiment, the grating includes one or more structural walls on one side of the grating forming a cavity adjacent a surface of the grating. In a further embodiment, the cavity is formed from the low refractive index material. In another embodiment, the high refractive index material regions are configured as an array in two dimensions with multiple axes of periodicity, each axis of the array having a unique pitch such that strain on the grating causes the resonant wavelength associated with each axis of the grating to be affected differently.

In one embodiment, a method of manufacturing a grating comprises providing a silicon wafer, depositing a molybdenum layer on the silicon wafer, depositing a titanium dioxide layer on the molybdenum layer, depositing an aluminum conduction layer on the titanium dioxide layer, patterning the grating in poly(methylmethacrylate) using electron-beam lithography, depositing chromium on the grating pattern, removing excess chromium to form a grating pattern hard mask, transferring the grating pattern to the titanium dioxide layer using dry etching, removing metals from the tops of the titanium dioxide grating pattern using an aluminum wet etchant, spin coating polydimethylsiloxane on the wafer surface to form a membrane, bonding a bulk polydimethylsiloxane structure to the membrane, and etching the molybdenum layer to release the membrane and grating from the silicon wafer.

Introduction

While GMR sensors themselves are inexpensive to manufacture, optical characterization of traditional GMR-based sensor systems can be complex and expensive. For example, in a typical bioassay system, a full-spectrum light source is used to illuminate the sensor surface, and the reflected light is directed to a spectrometer that measures the shift in resonant wavelength as reactions occur near the surface of the sensor in a liquid medium. Thus, most traditional GMR biosensors require a relatively complex characterization setup to operate and can include costly devices. This complexity limits the application of these existing systems as lab-on-a-chip devices. These examples of problems illustrate some of the current failures in the field of GMR sensor systems, though improvement in other areas is needed as well.

One illustrative embodiment of the grating provides a pressure-tunable GMR grating system for performing label-free characterizations of bioassays, though, as is discussed herein, the pressure-tunable GMR grating system may be used in other applications as well. As previously mentioned, traditional GMR grating systems often employ broad spectrum light sources for illuminating the sensor surface and a spectrometer for measuring the shift in resonant wavelength in a liquid medium. These traditional GMR grating systems are characterized by their reflectivity versus wavelength. The illustrative embodiments allow for reducing the complexity and cost of performing label-free bioassays by providing a pressure-tunable GMR grating system. The grating itself may be made tunable via air, or other fluid, pressure, allowing the response of the grating to be characterized using a fixed source and detector by its reflectivity versus applied air pressure. In one embodiment, an optical grating structure is provided that is embedded within a thin, flexible membrane which serves as its substrate. The pitch of the grating itself may be altered or "tuned" over a wide range of pitches by varying air pressure acting on the membrane. For instance, when pressure is applied to the membrane, the membrane may expand and cause the pitch (i.e., the mean distance between the structures on the grating) of the grating to increase. Increasing the pitch causes a shift in the resonant wavelength response of the grating. In one embodiment, this pressure-applied tunability allows the resonance of the grating, which corresponds to a change in the grating from optically transmissive to reflective, to be found relative to a single wavelength of incident light. Any changes in the optical properties of materials near the GMR sensor surface (for example, in a liquid medium) will result in a shift in the pressure required to obtain peak reflectivity. This shift may be used to determine the unique characteristics of the grating's surrounding medium.

While GMR gratings have achieved relatively widespread use for their applications as optical biosensors, the vast majority of GMR resonance grating applications consists of rigid grating structures and requires spectrometry to determine the optical properties of the grating. The illustrative embodiments eliminate the need for much of the associated optical characterization complexity, in particular, the need for such expensive equipment as a spectrometer. Instead, the tunable GMR grating system presented here may employ a single-wavelength source and a photodiode to optically characterize the resonance of the grating. Such a system has potential applications in a number of academic and practical settings. In particular, applications such as point-of-care medical treatment, medical facilities in the developing world, and at-home screening could greatly benefit from the reduced complexity and cost of this method. However, any application that may employ affordable label-free bioassays could also benefit from the illustrative embodiments. The illustrative embodiments may also be employed in defense applications to, for example, characterize unknown substances.

Design and Simulation

FIG. 1A is a mechanical model schematic diagram of a pressure-tunable guided-mode resonant diffraction grating according to an illustrative embodiment. In this embodiment, the grating structure may comprise a one-dimensional array of titanium dioxide ($TiO_2$) bars embedded within a thin, flexible polydimethylsiloxane (PDMS) membrane. In one non-limiting example, the $TiO_2$ nanograting may be embedded in one side of a 3 mm wide, 120 μm thick PDMS membrane, although other dimensions may be used. Channel structure walls may be significantly larger than the membrane thickness to avoid channel deformation. Pressure may be applied to a side of the air-suspended membrane opposite the grating in one embodiment, inflating the membrane and straining the grating in its direction of periodicity. Pressure may be applied to the grating in a number of ways, including simple means readily available in the situation. For example, in a medical setting, pressure may be applied via syringe.

Figure 1B:
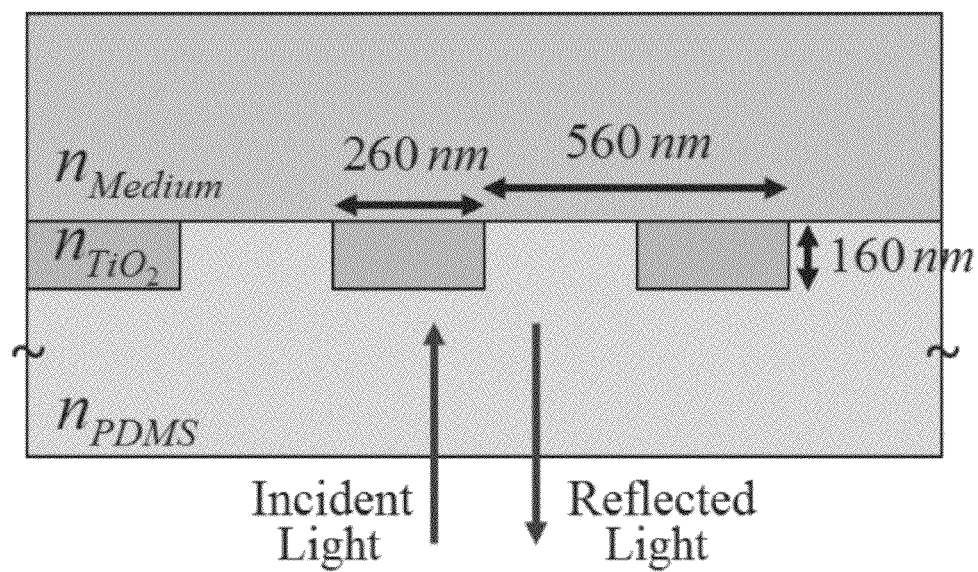
FIG. 1B is an optical model schematic diagram of a pressure-tunable guided-mode resonant diffraction grating according to an illustrative embodiment.

FIG. 1B is an optical model schematic diagram of a pressure-tunable guided-mode resonant diffraction grating according to an illustrative embodiment. In particular, FIG. 1B illustrates a schematic diagram and non-limiting example of the unstrained grating (no applied pressure). In this embodiment, the 160 nm thick periodic region may comprise alternating regions of high refractive index $TiO_2$ (n=2.3) and relatively low refractive index PDMS (n=1.4). The grating's period may be 560 nm, 260 nm of which is occupied by the $TiO_2$. The grating may be surrounded by PDMS on one side and a medium of either air (n=1.0) or water (n=1.33) on the other.

Mechanical simulation of the membrane and grating may be accomplished using COMSOL Multiphysics, a finite element method software package. A three-dimensional model of the membrane and grating structure may be created, and a distributed pressure load may be applied to the surface of the membrane. Since $TiO_2$ has such a high Young's modulus (2.8 GPa) compared to that of PDMS (750 kPa), the embedded $TiO_2$ bars may be negligibly deformed under applied pressure; as pressure is increased, the distance between the $TiO_2$ bars (i.e. the grating pitch) may be the only grating parameter significantly affected.

In one embodiment, when exposed to TM-polarized light normal to the grating surface, the grating in FIG. 1B may produce a resonance at a wavelength of around 815 nm when the medium is water. However, if the refractive index of the medium is increased or the PDMS strained (i.e., the pitch of the grating increased), the resonance shifts to a higher wavelength.

Figure 2A:
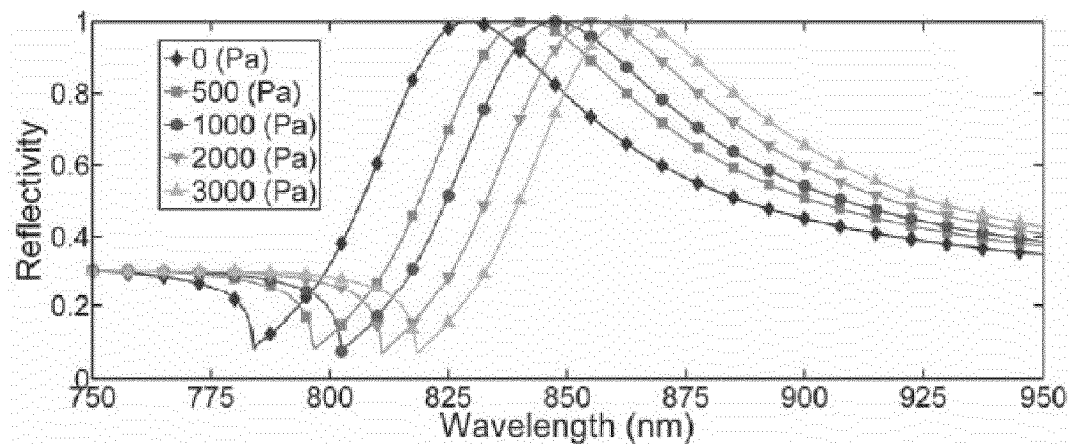
FIGS. 2A and 2B illustrate simulation results demonstrating shift in peak reflectivity with various applied pressures for (a) air and (b) water mediums according to illustrative embodiments.
Figure 2B:
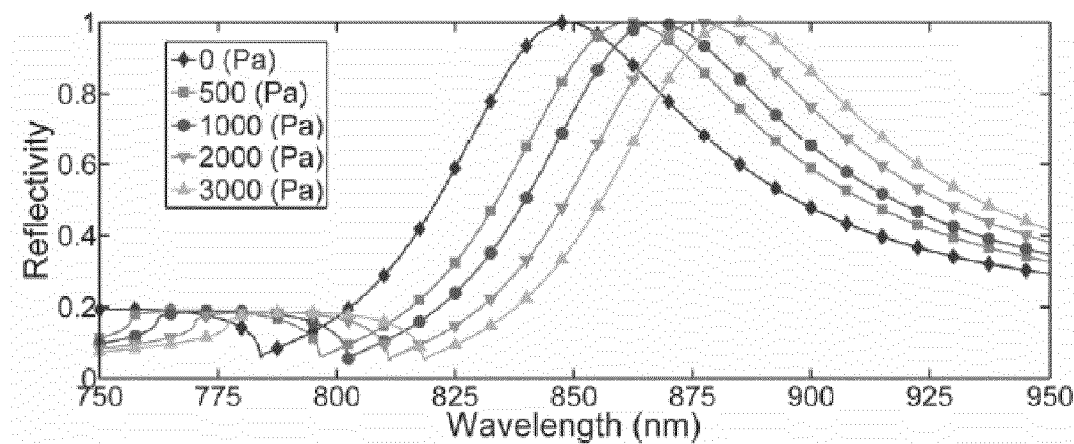
Figure 3A:
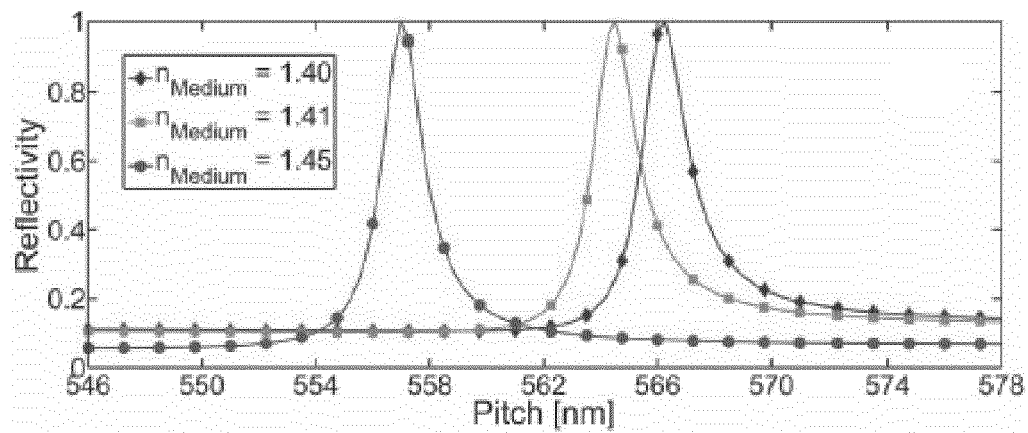
FIG. 3A depicts simulation results showing reflectivity versus grating pitch, for various refractive indices of the medium.
Figure 3B:
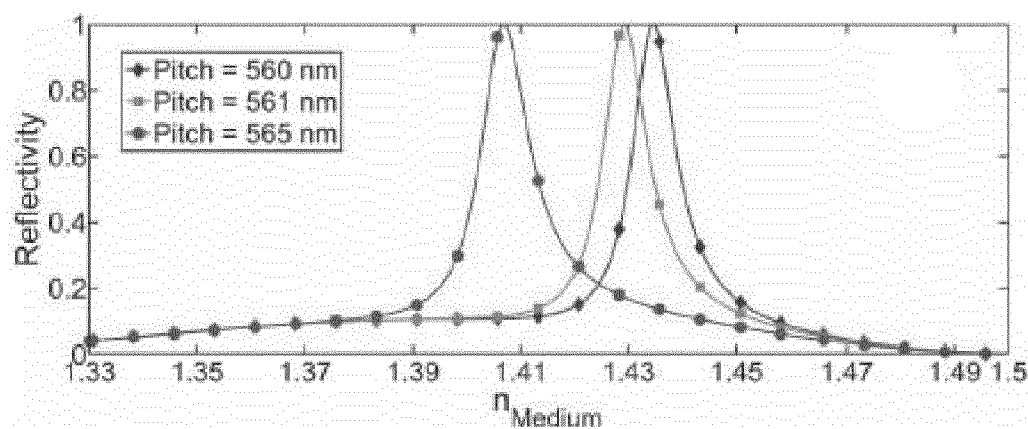
FIG. 3B depicts simulation results showing reflectivity versus refractive index of the medium, for various grating pitches at a wavelength of 850 nm.

Rigorous coupled wave analysis (RCWA) may be used to generate the optical simulation data using the grating pitch values obtained by mechanical simulation. FIGS. 2A and 2B illustrate simulation results demonstrating shift in peak reflectivity with various applied pressures for (a) air and (b) water mediums according to illustrative embodiments. In particular, these figures illustrate the transverse electric (TE) reflectivity spectrum of the grating at various applied pressures for both air and water mediums. Optical and mechanical simulation results may be obtained using RCWA and COMSOL Multiphysics, respectively. A clear shift in peak reflectivity is seen as applied pressure is increased, corresponding to the associated increase in the grating pitch.

FIGS. 3-7 illustrate characteristics of the GMR grating system according to an illustrative embodiment. In particular, FIG. 3A depicts simulation results showing reflectivity versus grating pitch, for various refractive indices of the medium. FIG. 3B depicts simulation results showing reflectivity versus refractive index of the medium, for various grating pitches at a wavelength of 850 nm. The GMR effect may occur when a diffracted order occurs at an angle acute enough to the grating surface to undergo total internal reflection. When such a diffracted order remains in phase after the reflection, a resonance occurs. For TM-polarized light, this corresponds to a solution of the equation $$\tan(\kappa_i t) = \frac{n_g^2 \kappa_i (n_{Medium}^2 \gamma_i + n_{Substrate}^2 \delta_i)}{n_{Substrate}^2 n_{Medium}^2 \kappa_i^2 - n_g^4 \gamma_i \delta_i}, \tag{1}$$

where $\kappa_i = (n_g^2 k^2 - \beta_i^2)^{1/2}$, $\gamma_i = (\beta_i^2 - n_{Substrate} k^2)^{1/2}$, $\delta_i = (\beta_i^2 - n_{Medium} k^2)^{1/2}$, and $\beta_i = k(n_g \sin \theta - i\lambda/\Lambda)$. The average refractive index of the grating is given by $n_g$, the order of diffraction is given by i, and the angle of incidence is given by θ. The pitch is represented by Λ.

Figure 4:
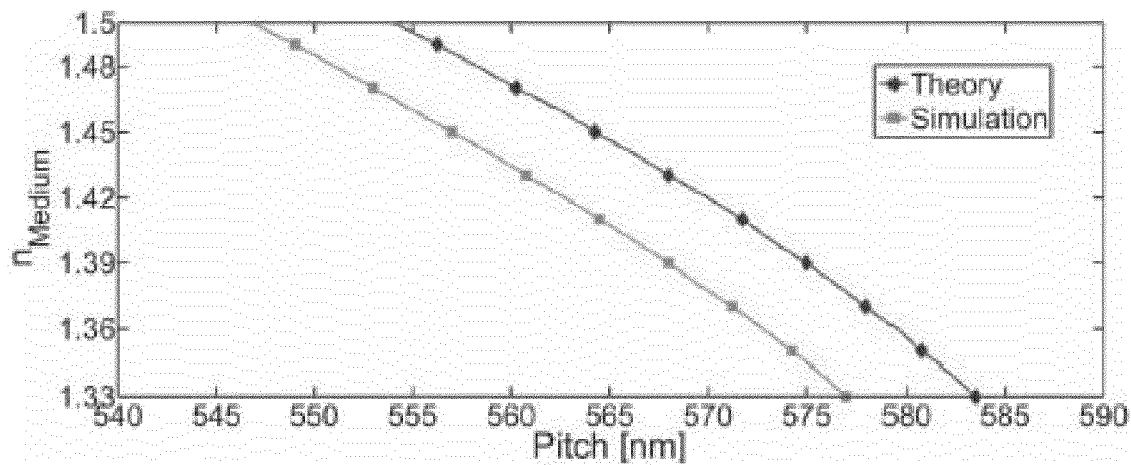
FIG. 4 compares the location of resonance peaks in terms of grating pitch and refractive index of the medium for theoretical results and COMSOL simulation results.

FIG. 4 compares the location of resonance peaks in terms of grating pitch and refractive index of the medium for both theoretical results (from Eq. (1)) and COMSOL simulation results. These example results show good agreement on the movement of the peak relative to a change in either pitch or $n_{Medium}$.

Figure 5:
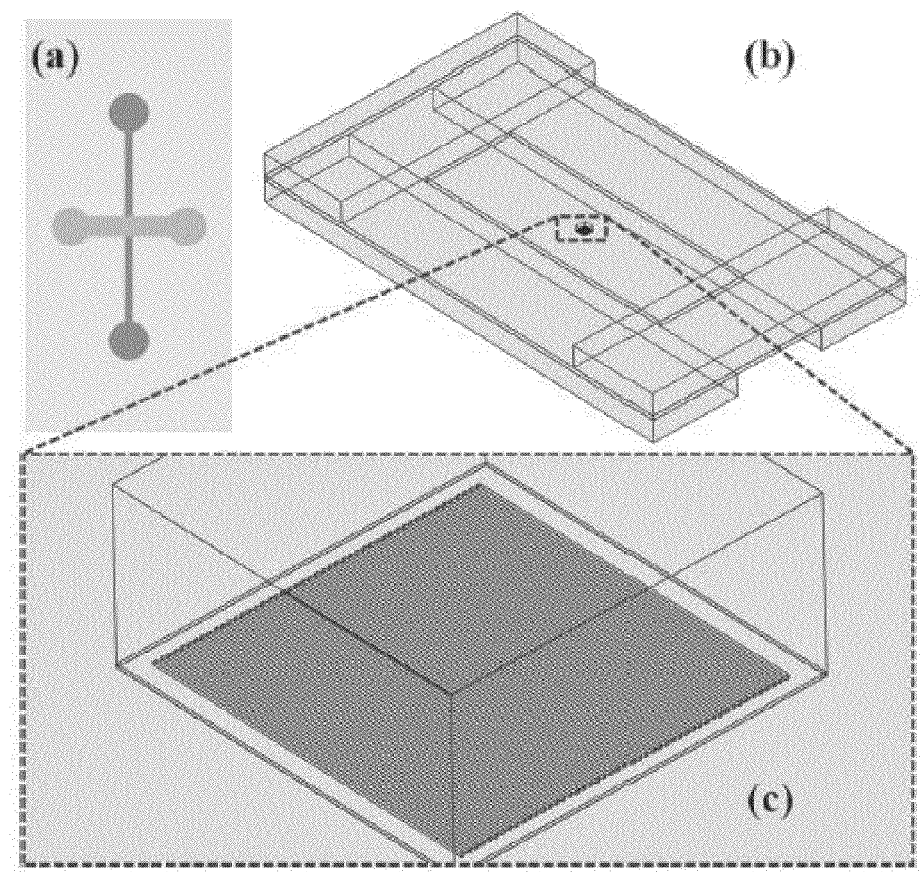
FIG. 5 illustrates (a) the overlapping channel structures, (b) the mechanical simulation model; only the overlapping regions of the channels (without backing) and membrane were included in this particular embodiment, and (c) a close-up of the grating region according to an illustrative embodiment.

In another illustrative embodiment, the $TiO_2$ structures may be embedded at the surface of a 50 µm thick PDMS membrane separating two channels, as shown in FIG. 5. FIG. 5 illustrates (a) the overlapping channel structures, (b) the mechanical simulation model; only the overlapping regions of the channels (without backing) and membrane were included in this particular embodiment, and (c) a close-up of the grating region according to an illustrative embodiment. The channel on the side of the grating may contain the fluid sample (medium), while the channel on the opposite side may be used to modulate the pressure acting on the membrane. The overlapping channels may be of different widths such that the membrane is narrower in the direction of the grating. This may ensure that the lateral strain on the membrane is greater than the longitudinal strain. For the 1 mm×3 mm channel overlap presented here, lateral strain may be around 10 times greater than longitudinal strain. For the mechanical simulation model, the grating dimensions used in one embodiment were Λ=2 µm, w=1.025 µm, and t=1 µm. Use of smaller grating dimensions may not noticeably improve the results and may increase the simulation time dramatically; the correct $TiO_2$ fill factor may be preserved while ensuring that the grating dimensions are sufficiently small relative to the dimensions of the membrane.

Figure 6:
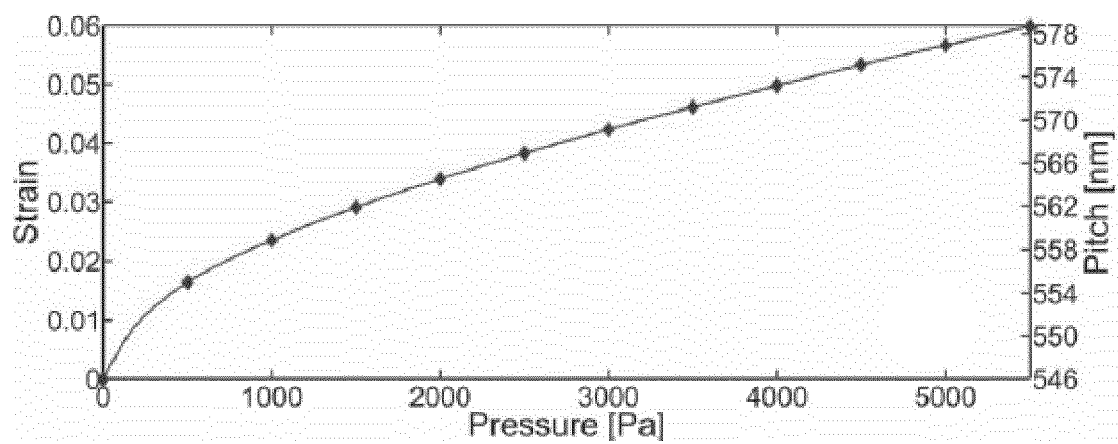
FIG. 6 illustrates the effective strain acting on the grating pitch according to an illustrative embodiment.

The effective strain acting on the grating pitch is given in FIG. 6. In this embodiment, a pressure difference of only 5500 Pa can tune the sensor over a range of 546-578 nm pitch, enough to operate in media of a refractive index of 1.33-1.5 for single wavelength characterization.

At a maximum pressure of 5500 Pa, out-of-plane displacement of the PDMS membrane may be around 243 µm. Beam divergence of the source may either be negligible over this range or may be compensated for to avoid unwanted distortion of the output, and the PDMS channel may be sufficiently deep to provide clearance for the membrane.

Figure 7A:
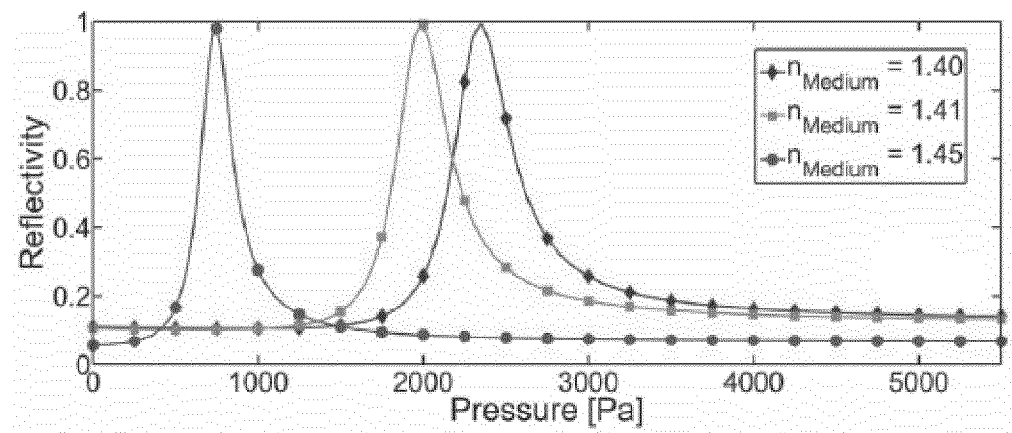
FIG. 7A illustrates finite element method (FEM) simulation results showing reflectivity versus pressure for various medium refractive indices at a wavelength of 850 nm according to an illustrative embodiment.
Figure 7B:
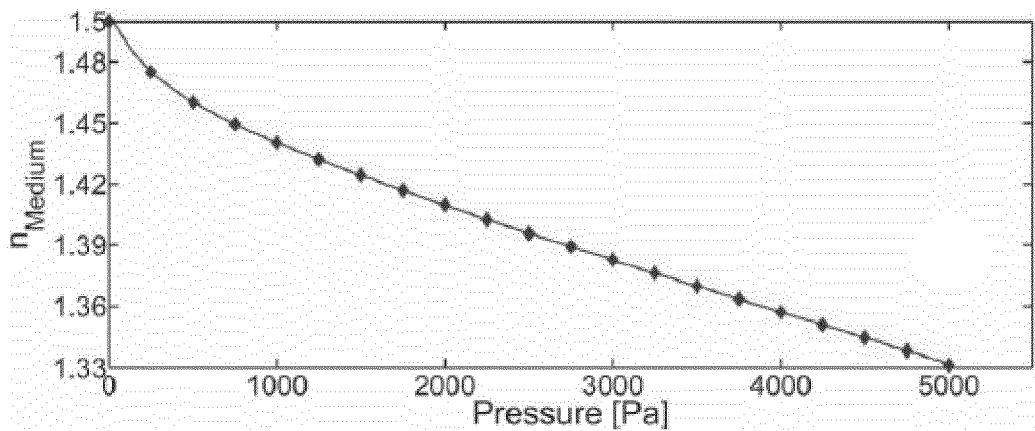
FIG. 7B illustrates the location of the resonance peak at a wavelength of 850 nm in terms of both pressure and the refractive index of the medium according to an illustrative embodiment.

By combining the results of FIG. 6 with the optical simulation results, the reflectivity of the grating in terms of pressure may be obtained relative to a single wavelength of incident light. FIG. 7A illustrates COMSOL simulation results showing reflectivity versus pressure for various medium refractive indices at a wavelength of 850 nm according to this illustrative embodiment. FIG. 7B illustrates the location of the resonance peak in terms of both pressure and the refractive index of the medium according to this illustrative embodiment.

For GMR sensors, sensitivity may be defined as the change in peak wavelength value (PWV) per change in medium refractive index, or ΔPWV=Δn. Since the resonance of this sensor may occur at a specific pressure, as opposed to wavelength, its sensitivity may be defined as a change in peak pressure value (PPV) per change in medium refractive index, or ΔPPV=Δn. Using this equation, this device, in one embodiment, may have a sensitivity ranging from around 7.5 kPa/refractive index unit (R.I.U.) for small changes in pressure to around 39 kPa/R.I.U. for most of the sensor range, corresponding to the linear region of FIG. 7B.

Device Fabrication

During device testing, it may be found that the vast majority of defects in the grating structures arise due to mishandling of the delicate membranes in which they were embedded. In order to minimize the occurrence of such grating damage, the device may be first fully fabricated on a rigid substrate, and then released from the substrate in its completed form.

Figure 8:
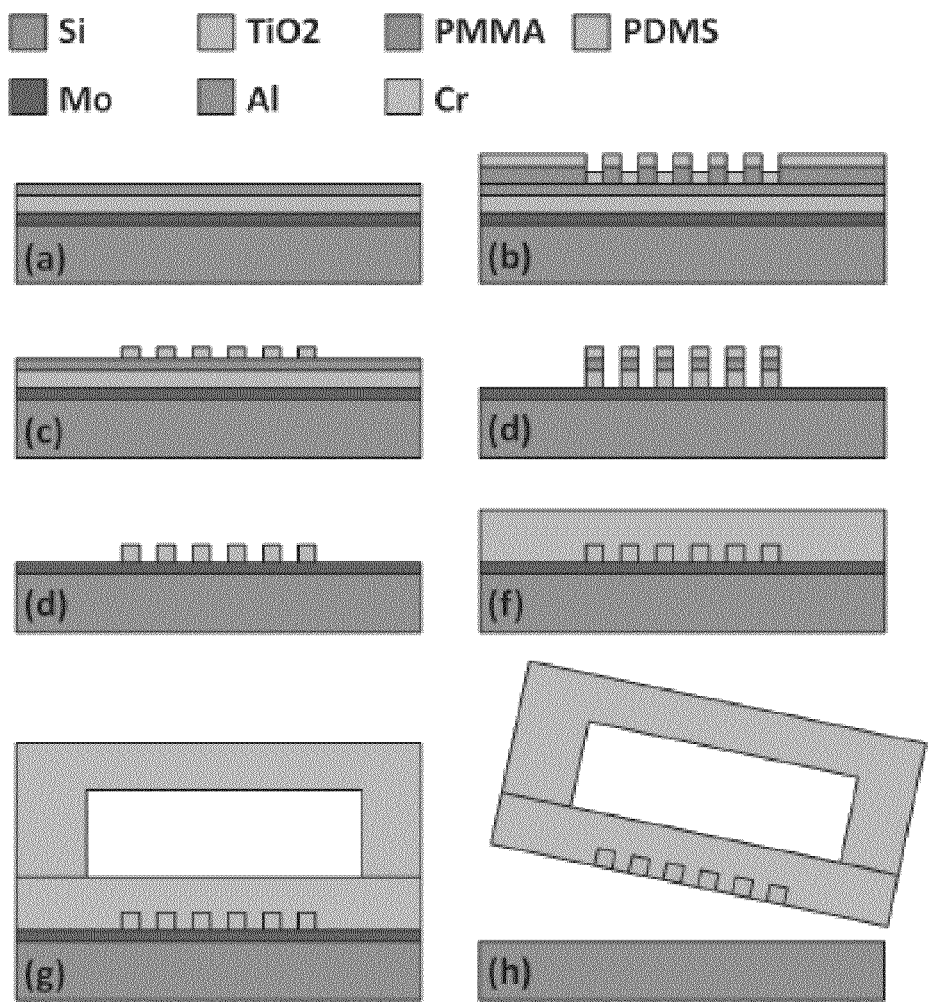
FIG. 8 is a diagram illustrating an example procedure for fabricating a pressure-tunable guided-mode resonant diffraction grating according to an illustrative embodiment.

FIG. 8 is a diagram illustrating an example procedure for fabricating a pressure-tunable guided-mode resonant diffraction grating according to an illustrative embodiment. In particular, FIG. 8 illustrates steps in the fabrication process. To allow for the release of the device, a 100 nm thin film of molybdenum (Mo) may be deposited on a silicon wafer to serve as a sacrificial layer. A 160 nm thick layer of $TiO_2$ may then be deposited via sputtering, followed by a 30 nm aluminum conduction layer to reduce dielectric charging during electron-beam lithography (EBL).

The grating itself may be patterned in poly(methylmethacrylate) (PMMA) using EBL over an area of 750 by 750 µm. A chromium hard mask may be created through the liftoff process, and the pattern may then be transferred into the $TiO_2$ film by reactive ion etching. An aluminum etchant may be used to remove the remaining metals from the tops of the $TiO_2$ grating lines, preparing the grating to be embedded in the membrane.

PDMS may be spin-coated and cured on the wafer surface to form the membrane, and then bonded to a PDMS channel structure. The entire structure may then be immersed in hydrogen peroxide ($H_2O_2$) to etch away the Mo sacrificial layer, releasing the device from the substrate.

Figure 9A:
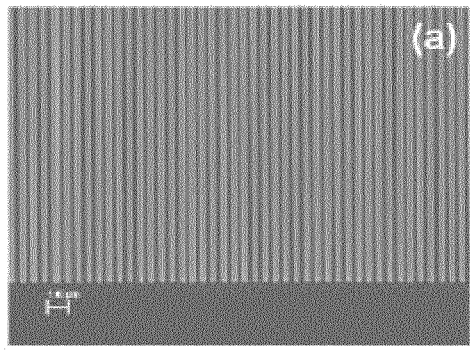
FIGS. 9A and 9B are scanning electron microscope (SEM) images of the grating structure prior to release from the substrate according to an illustrative embodiment.
Figure 9B:
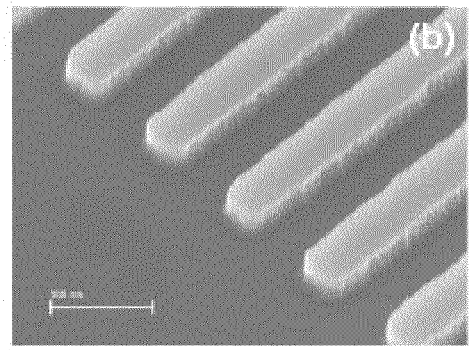
Figure 9C:
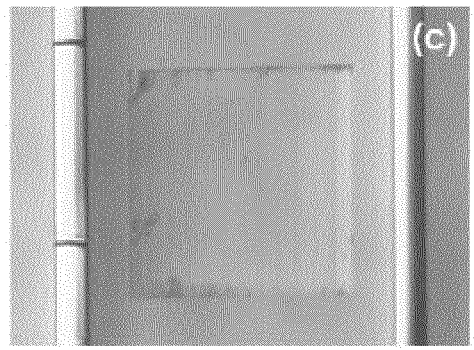
FIGS. 9C and 9D are optical photographs of the grating structure after release from the substrate according to an illustrative embodiment.
Figure 9D:
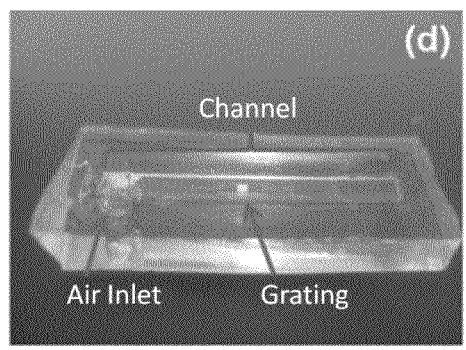

FIGS. 9A and 9B are scanning electron microscope (SEM) illustrations of the grating structure prior to release from the substrate according to an illustrative embodiment. FIG. 9A illustrates an SEM micrograph of $TiO_2$ lines on Mo sacrificial layer. FIG. 9B illustrates a close-up of $TiO_2$ lines showing vertical sidewalls produced by dry etch. FIGS. 9C and 9D are optical photographs of the grating structure after release from the substrate according to an illustrative embodiment. In particular, FIG. 9C illustrates an optical microscope image of a grating suspended in PDMS, exhibiting only minor damage from release process. The thick vertical lines on the sides of the grating are remnants of EBL alignment marks. FIG. 9D illustrates a photograph of final device according to an illustrative embodiment. The 750×750 µm grating is clearly visible.

Experimental Setup

In order to properly characterize the device, a means of making fine adjustments to the pressure acting upon the membrane may be used. To accomplish this, one end of a length of tubing may be connected to the air inlet of the device (see FIG. 9D), and the other end of the tubing may be connected to a closed system consisting of an airtight container and a 30 mL syringe. With the syringe plunger fully withdrawn, the total volume of the closed system may be 900 mL, in a non-limiting example. Since the pressure of the system is known to be equal to atmospheric pressure (roughly 101 kPa) initially, the pressure as the syringe is depressed may be calculated by Boyle's law, $$p_1 V_1 = p_2 V_2 \quad (2)$$

The syringe may be depressed in increments of 0.5 mL, corresponding to a step size in relative pressure of 56~60 Pa over a range of nearly 3500 Pa.

The grating's optical properties may be characterized in the following manner. A broad-spectrum halogen light source may be connected to one leg of a reflection probe, and the output light may be collimated using a series of lenses. Since the grating used may produce the strongest resonance response for TE polarized light, a linear polarizer may be used to ensure that the electric field of the incident light was aligned parallel to the grating lines. Care is taken to ensure that the resulting illumination spot was aligned with the center of the GMR grating at normal incidence to avoid any unwanted effects associated with off-axis illumination.

The light reflected from the grating may be analyzed by a spectrometer connected to the other leg of the reflection probe. As the plunger of the syringe is depressed, a full reflectivity spectrum may be recorded for each incremental pressure.

Results

Figure 10A:
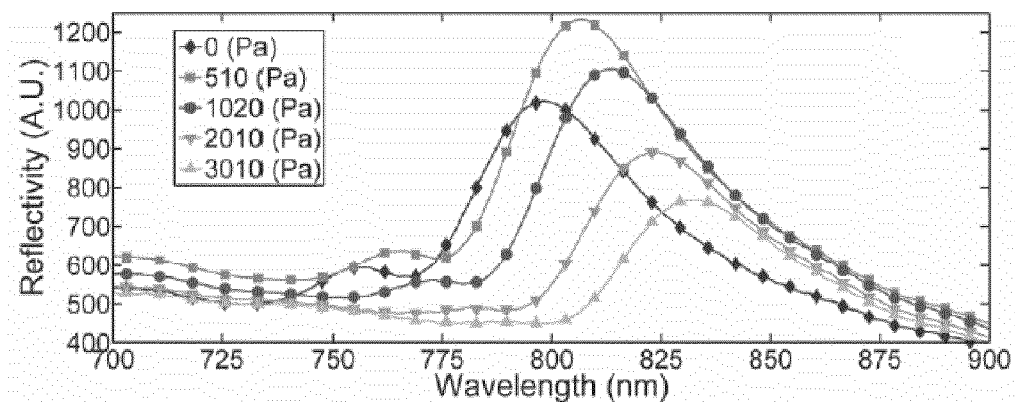
FIGS. 10A and 10B illustrate experimental results of reflectivity spectra for (a) air and (b) water mediums according to an illustrative embodiment.
Figure 10B:
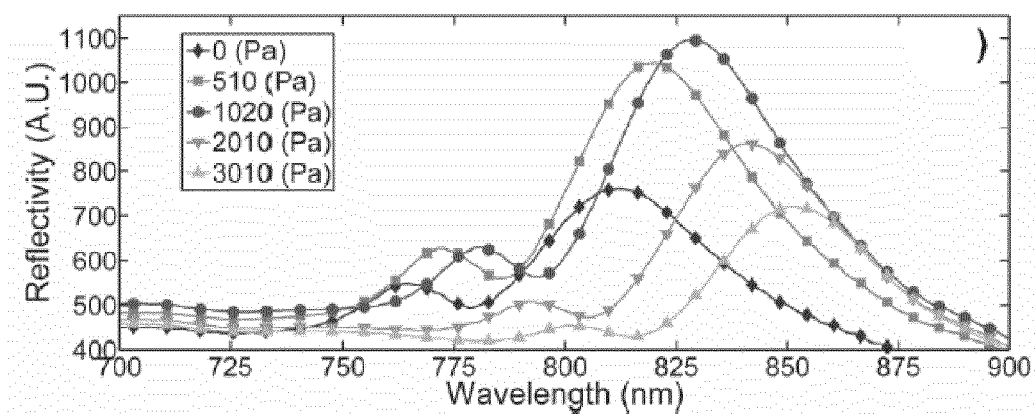
Figure 11:
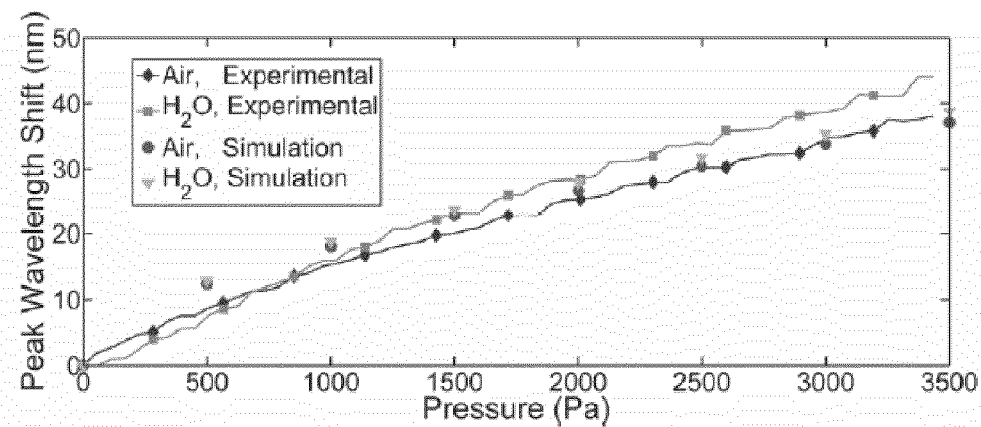
FIG. 11 illustrates a comparison of experimental and simulation values of peak wavelength shift according to an illustrative embodiment.

FIGS. 10A and 10B illustrate experimental results of spectra reflectivity for (a) air and (b) water mediums according to an illustrative embodiment. In particular, FIGS. 10A and 10B show the recorded TE reflectance spectra for both air and deionized water mediums at various applied pressures. A shift in resonant wavelength may be observed as pressure is increased. As is seen in the simulation results, the resonance peaks shift to higher wavelengths as the pressure acting on the membrane is increased. A relative shift in peak wavelength with applied pressure is observed. FIG. 11 illustrates a comparison of experimental and simulation values of peak wavelength shift according to an illustrative embodiment. FIG. 11 shows that there is good agreement between experiment and simulation, suggesting that the strain acting upon the grating under applied pressure is close to the predicted values.

Figure 12:
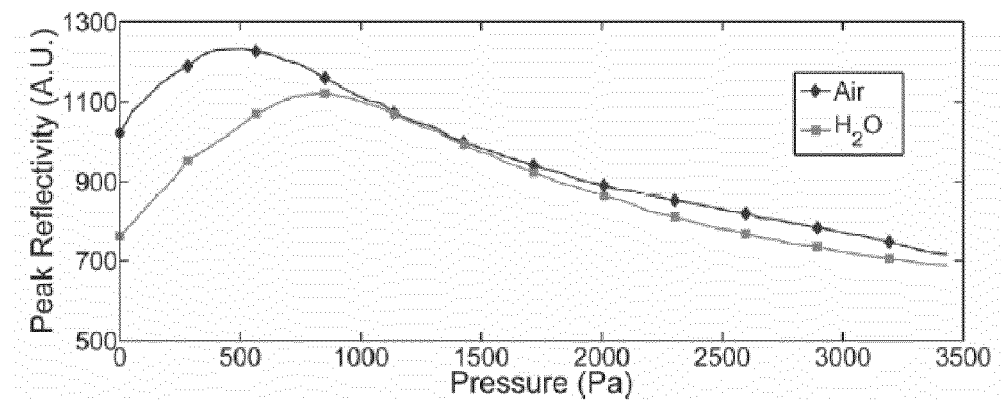
FIG. 12 illustrates attenuation observed in reflectivity peaks according to an illustrative embodiment.

One other key difference between the experimental and simulation results is that some attenuation of the resonance peaks may occur as the pressure is changed. This is most likely caused by out-of-plane curvature of the grating as the membrane expands, which was neglected in the simulation due to limitations of the frequency-domain approach of RCWA. FIG. 12 illustrates attenuation observed in reflectivity peaks according to an illustrative embodiment. The amount of attenuation for a given applied pressure was consistent over time, however, making it possible to normalize the data by dividing the reflectance spectrum by the reflectivity at the peak, $$R_{norm} = \frac{R}{\max(R)} \quad (3)$$

Figure 13A:
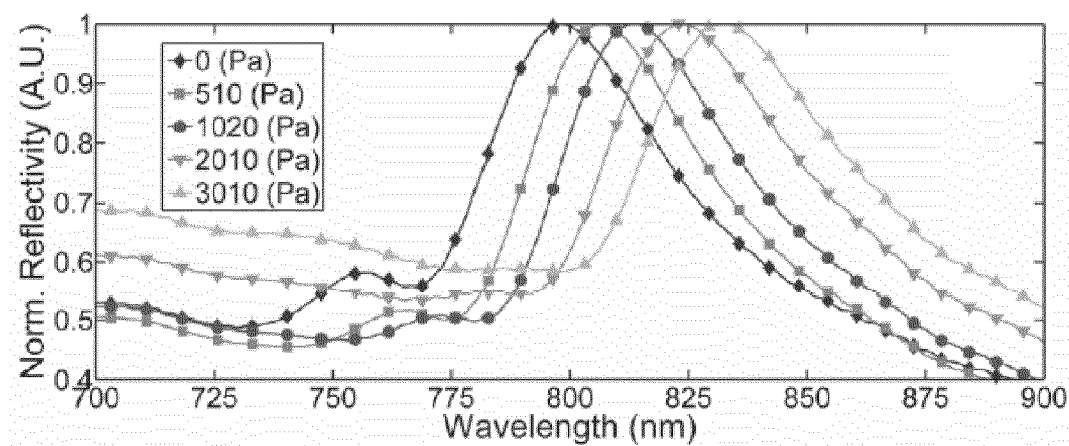
FIGS. 13A and 13B illustrate normalized reflectivity spectra for (a) air and (b) water mediums, respectively, according to an illustrative embodiment.
Figure 13B:
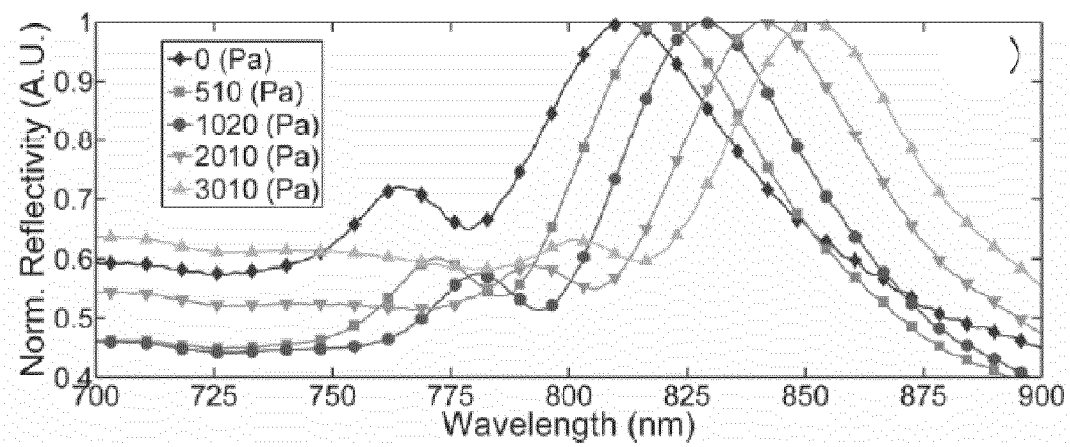

FIGS. 13A and 13B illustrate normalized reflectivity spectra for (a) air and (b) water mediums, respectively, according to an illustrative embodiment. Once attenuation is eliminated, the experimental results more closely resemble the form of the simulation data, and it may become easier to identify the peak resonance shifts associated with changes in pressure.

Figure 14:
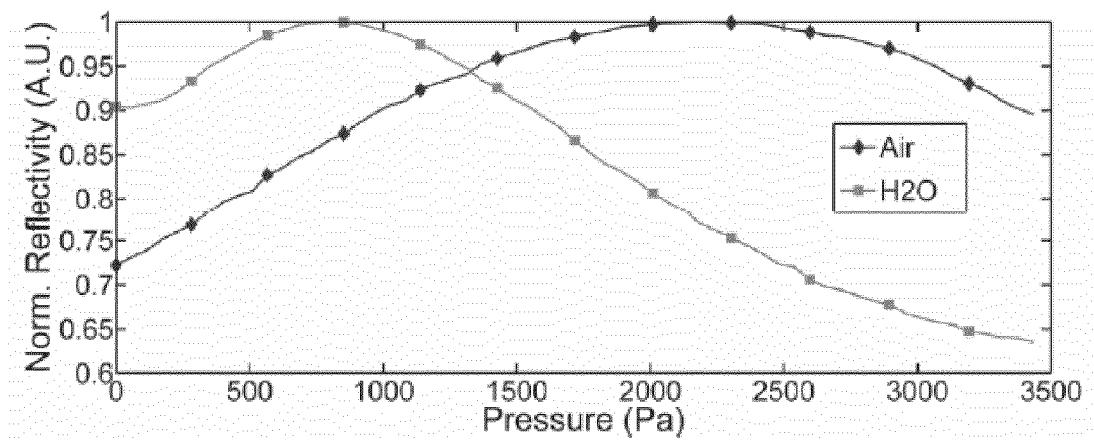
FIG. 14 illustrates experimental results of reflectivity vs. pressure at a fixed wavelength according to an illustrative embodiment.

One example feature of such a widely tunable grating device is the ability to manipulate resonance with respect to wavelength. For example, for a rigid grating, pitch is held constant by design, producing a resonance that occurs at a specific wavelength. Similarly, for a tunable grating, wavelength may be intentionally held constant, resulting in a resonance that occurs at a specific pitch (or pressure). FIG. 14 illustrates experimental results of reflectivity vs. pressure at a fixed wavelength according to an illustrative embodiment. In this embodiment, the wavelength is fixed at 825 nm. Peak reflectivity values shift to the left as refractive index of the medium is increased. Just as an increase in RI of the medium causes resonance to shift to higher wavelengths for a fixed-pitch grating, such a change in RI may cause resonance of this tunable grating to shift to lower pressures at a constant wavelength.

Conclusions

A pressure-tunable nanoscale GMR grating is successfully designed, fabricated, and tested. A tunable range of over 35 nm was demonstrated for both an air and water medium, showing good agreement with expected performance in both cases. In one embodiment, it is possible to compensate for any attenuation of the reflectivity spectra as pressure is varied.

The ability to tune the pitch of the grating via pressure is used to demonstrate a fixed-wavelength resonance response. In one example, a pressure-dependant resonance is observed for both air and water media at a wavelength of 825 nm. Such a widely tunable device could find new applications in a number of fields in which rigid-substrate GMR devices are already established.

Microfluidic Applications

Another embodiment of the disclosure comprises a high-resolution optical pressure sensor based on guided-mode resonance in a titanium dioxide ($TiO_2$) nanograting embedded in an 85 μm thick polydimethylsiloxane (PDMS) membrane. This embodiment is capable of resolving changes in pressure as small as 200 millitorr within a PDMS channel. The embedded guided-mode resonance (GMR) grating may have a pitch distance of 500 nm when the PDMS membrane is unstrained; at this pitch, the grating may have a resonance response at around 727 nm, producing a peak in the reflectivity spectrum of the device. When pressure within the channel increases, the membrane is strained, resulting in an increase in the grating pitch as well as its corresponding resonant wavelength. By measuring the resulting change in the reflectivity spectrum of the grating, the sensor may be able to detect changes in relative pressure throughout a range of over 60 Torr.

Precise measurement of internal pressures and flow rates of microfluidic channels may be crucial to the development and characterization of a number of lab-on-a-chip devices. The use of an external pressure-sensing apparatus is impractical for most microfluidic applications due to the behavior of fluids at such small scales; a remote pressure sensor connected to a microchannel would not only fail to produce an accurate reading, but the significant increase in volume associated with its presence would fundamentally alter the performance of the microfluidic device. Thus, in order to achieve an accurate measurement, a simple and effective means of integrating the sensing element directly into the microchannel is needed.

A number of techniques have been used to accomplish local-pressure measurements in microfluidic devices. One such technique has demonstrated a capacitive pressure sensor for microfluidic flow measurement, an approach capable of achieving extremely high resolutions of around 1 millitorr, but which greatly increases the complexity of the microfluidic device. In order to keep the cost of each microfluidic device low, it is in many ways advantageous to minimize the complexity of the on-chip sensing elements.

In the interest of keeping device complexity low, the designer may incorporate only essential sensing elements into the device itself, while offloading the majority of the sensor complexity to an external apparatus. To this end, several passive optical pressure sensing devices have also been demonstrated; such examples include a deformable polydimethylsiloxane (PDMS) grating-based device, as well as a reflective silicon membrane-based device. While simple to implement, both of these devices respond to relatively high pressures, with resolutions greater than 1 Torr. An optical approach to pressure sensing is disclosed in the illustrative embodiments which may utilize the high sensitivity of guided-mode resonance (GMR) gratings in conjunction with the elasticity of PDMS; the device demonstrated here has a resolution of 200 millitorr, without effecting a significant increase in the overall complexity of the microfluidic device it is integrated into.

Guided-mode resonance gratings are a type of dielectric diffraction grating which exhibits a sharp increase in reflectivity near particular resonant wavelengths. The location of these resonances may be highly dependent on a number of parameters, including not only material properties, such as the refractive indices of the constituent materials, but also the physical dimensions of the grating. Due to their sensitivity to changes in the refractive index (RI) of their surrounding media, GMR gratings have been well-studied for their application as a type of label-free biosensor. In contrast, sensors utilizing changes in the physical dimensions of the grating have received far less attention since most guided-mode resonance gratings are fabricated on solid substrates.

Figure 15:
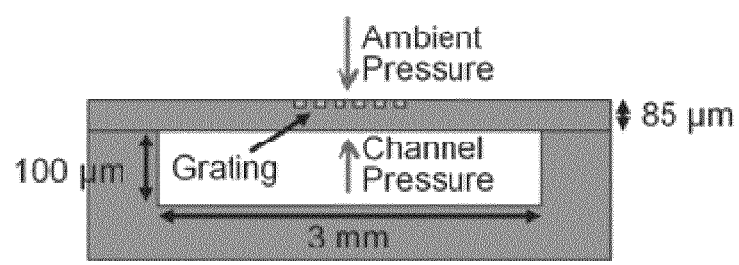
FIG. 15 illustrates a cross-section schematic of a one-dimensional GMR grating embedded at the surface of a thin, flexible membrane according to an illustrative embodiment.

The GMR effect exhibits a particularly strong dependence on grating pitch, the distance between repeating elements of the grating structure. Due to this dependence, shifts in resonance location may be used to detect strain in gratings fabricated on flexible substrates. The embodiment may exploit this pitch-dependence to measure pressure by means of a one-dimensional GMR grating embedded at the surface of a thin, flexible membrane (a cross-section schematic of which is shown in FIG. 15). With this configuration, small changes in channel pressure may be detected via a shift in grating resonance due to the strain induced in the grating as the membrane expands.

Theory

Guided mode resonance occurs in dielectric gratings deep enough to function simultaneously as both a diffraction grating and a slab waveguide. Light incident on the dielectric grating is diffracted, as is the case for any sub-wavelength periodic structure; this produces multiple spectral orders at various angles to the original direction of incidence. Under appropriate conditions, one or more of these spectral orders may become trapped within the grating region due to total internal reflection. At resonance, one or more of these trapped spectral orders excites a slab waveguide mode, albeit one that loses energy quickly as the wave propagates through the guide due to non-uniform slab profile of the periodic grating medium. Such inefficient modes are termed "leaky" due to their significant loss of energy, giving rise to one of guided-mode resonance's alternate monikers, "leaky mode resonance". The portion of the guided order lost from the waveguide mode couples to the light reflected from the grating, causing the typically transmissive dielectric grating to become highly reflective near resonance conditions.

Figure 16:
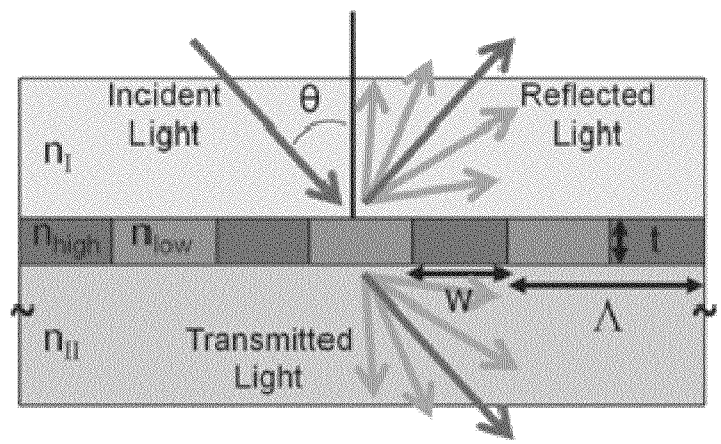
FIG. 16 shows a schematic representation of a grating with the relevant parameters labeled according to an illustrative embodiment.

While a complete description of the behavior of the electromagnetic field within a grating at resonance requires advanced numerical techniques, the boundary conditions within which resonance may occur are easily understood. For simplicity and relevance to one embodiment, it may be assumed that this grating region is periodic in only one direction and has a binary profile (i.e., there are abrupt discontinuities between materials). In addition, it may be assumed for the example embodiment that light is incident on the grating at an angle θ, and that the plane of incidence is normal to the grating lines. FIG. 16 shows a schematic representation of such a grating with the relevant parameters labeled.

Resonance may occur due to the coupling between the incoming and outgoing waves and standing waves within the grating itself. Due to the aforementioned diffraction grating/waveguide duality of a GMR grating, it may be at times convenient to treat the grating as a homogeneous slab with a uniform RI. To calculate the equivalent refractive index of this slab, one may first determine the volume ratios of the grating's constituent components. The fraction of the grating occupied by the high refractive index (RI) material (often referred to as the 'fill factor' of the grating) may be given by $$f = w/\Lambda \qquad (1)$$

where w is the width of the high RI regions and $\Lambda$ is the grating pitch. The equivalent RI of the grating slab is then given by $$n_g = n_{high} f + n_{low}(1-f) \qquad (2)$$

where $n_{high}$ and $n_{low}$ are the respective RIs of the grating region materials.

For any order of diffraction, i, two conditions are met in order for a standing wave to exist inside the grating. The first condition is that the diffracted order is not evanescent, meaning that it must have a real component normal to the grating region. For this to be true, the wavevector component of the order which is tangent to the grating surface must not exceed the total wavevector magnitude in the grating region, or equivalently $$\left| n_g \sin\theta - \frac{i\lambda}{\Lambda} \right| < n_g \qquad (3)$$

The second condition for a standing wave in the grating region is that the diffracted order must occur at an angle oblique enough to the grating 'slab' for total internal reflection to occur. The condition for total internal reflection may be derived from Snell's law, and is given by $$\left| n_g \sin\theta - \frac{i\lambda}{\Lambda} \right| > \max\{n_I, n_{II}\} \qquad (4)$$

After substituting equations (1) and (2) into (3) and (4), it is possible to rearrange these equations to solve for the range of wavelengths within which guided-mode resonance may occur. As the embodiment discloses here is illuminated at normal incidence (θ=0), this inequality reduces to $$\frac{\Lambda \max\{n_I, n_{II}\}}{|i|} < \lambda < \frac{[n_{high} w + n_{low}(\Lambda - w)]}{|i|} \qquad (5)$$

This relationship is further simplified by the fact that the embodiment disclosed here is a strict first-order grating (|i|=1) for the wavelengths analyzed. It may be clear by inspection that the range of possible resonant wavelengths increases for all orders of diffraction as the grating pitch, $\Lambda$, increases; this qualitatively demonstrates that an increase in grating pitch due to strain will induce an increase in the resonant wavelength, although more sophisticated methods are required to determine the exact magnitude of this shift.

In order to precisely calculate wavelengths at which resonance may occur, the waveguide mode may be determined. A number of numerical techniques exist to compute the reflectance spectra of diffraction gratings. One common numerical method, rigorous coupled-wave analysis (RCWA), uses Floquet's theorem to solve Maxwell's equations within the periodic regions. A full field solution to Maxwell's equations, such as that obtained using the finite element method (FEM), may also be used to determine the reflectance spectrum of a grating, as well as to analyze the behavior of the electromagnetic field inside the grating. Both RCWA and FEM may be used in the embodiments to determine the optical response of the sensor device, the results of which are presented in the following section.

Design and Simulation

Figure 17:
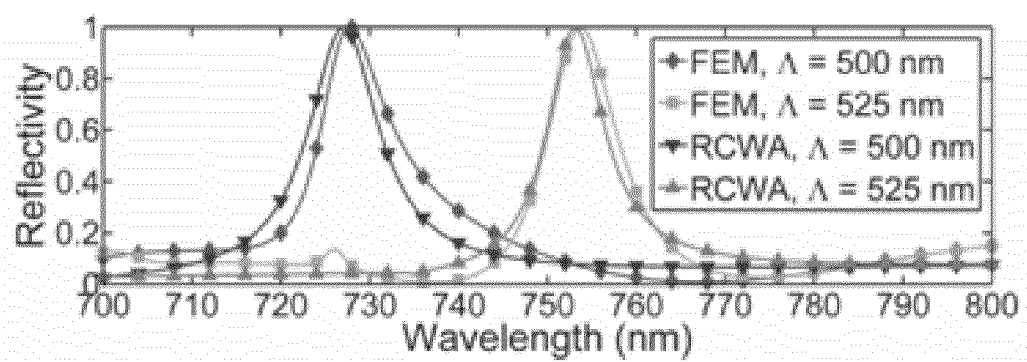
FIG. 17 illustrates results simulation methods for a grating according to an illustrative embodiment.

The initial parameters of the GMR grating used in this embodiment are as follows in reference to FIG. 16: Λ=500 nm, w=260 nm, t=160 nm, $n_I$=1.0 (air), $n_{II}$=$n_{low}$=1.4 (PDMS), and $n_{high}$=2.3 (TiO$_2$). Optical simulation results for such a grating illuminated by transverse magnetic (TM) polarized light at normal incidence were obtained using FEM (using COMSOL Multiphysics™) and RCWA, and the results compared to verify their agreement. FIG. 17 illustrates the results of both simulation methods for a grating consisting of all the initial parameters, as well as a grating with a 5% larger pitch (Λ=525 nm). The reflectance spectra generated by the FEM and RCWA models agree reasonably well, particularly on the locations of the resonance peaks; minor discrepancies throughout the spectra are to be expected from such numerical methods. As predicted in the previous section, an increase in grating pitch results in a clear increase in the resonant wavelength; here we see a 5% increase in pitch corresponding to an increase in resonant wavelength of around 25 nm.

The FEM model may also be used to inspect the magnetic fields associated with the illuminated grating. FIG. 18A shows the magnetic field at the resonant wavelength (λ=727 nm), while FIG. 18B shows the magnetic field in an off-resonance condition (λ=765 nm). At resonance, a highly concentrated magnetic field exists within the grating region which appears to become purely evanescent on the transmission side, corresponding to an excitation of a leaky mode. When the grating is not at resonance, however, the perturbations to the magnetic field caused by the grating subside within the space of a few wavelengths, and the incident magnetic field carries on to the transmission side of the grating.

In order to determine the strain acting on the grating under applied pressure, one may also consider the mechanical response of the sensor device. The active portion of the sensor device may be comprised of a titanium dioxide (TiO$_2$) GMR grating embedded at the surface of an 85 μm thick polydimethylsiloxane (PDMS) grating as shown in FIG. 15. The membrane may be suspended over a sealed channel 3 mm wide (in the direction of the grating's periodicity), and 20 mm long. The channel may terminate in 5 mm diameter circular regions at both ends, one of which serves as an air inlet during the experimental procedure.

Mechanical simulation of the sensor device was performed via FEM in COMSOL Multiphysics®. The entire channel and membrane geometry was modeled in three-dimensions as shown in FIG. 19A, although the grating geometry was not included. The grating geometry was not included due to limitations in the finite element method that may be experienced when dealing with highly complex geometries, particularly those with a mixture of very small and very large dimensions. However, due to the extremely small volume ratio of TiO$_2$ to PDMS in the membrane, the contribution of TiO$_2$ to the mechanical properties of the membrane is negligible enough that the omission should not significantly impact the results.

A Young's modulus of 0.75 MPa was used for the bulk PDMS of the channel walls, while a different Young's modulus is needed for the membrane due to an increase in PMDS stiffness observed due to both increasing curing temperature and decreasing film thickness. Values of Young's modulus for PDMS have been reported ranging from around 0.35 MPa to over 3 MPa. Since the membrane used in the sensor device may be both thin and cured at a relatively high temperature (e.g., 110° C.), a Young's modulus of 3 MPa was chosen for the PDMS membrane in this simulation. A Poisson's ratio of 0.499 was used for both the channel walls and the membrane.

Figure 20:
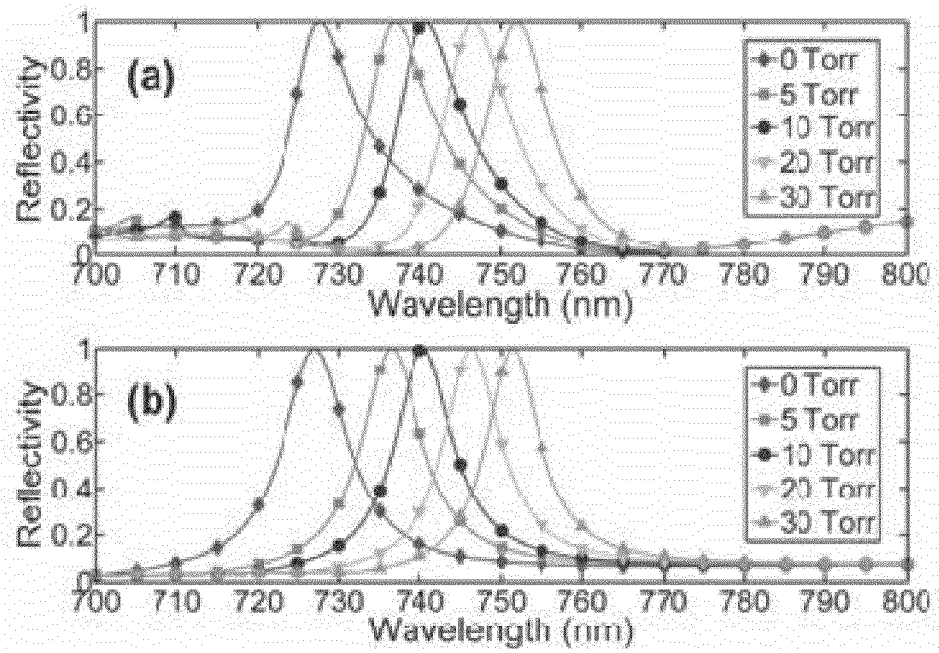
FIG. 20 illustrates compound simulation results, with applied pressure linked directly to the resulting reflection spectra of the grating according to an illustrative embodiment.

Pressures varying from 0 to 60 Torr were applied to the channel; as expected, the membrane expanded, achieving a maximum out-of-plane displacement of around 500 μm at the center of the membrane, and a little over 700 μm at the centers of the inlets as shown in FIG. 19B. One may also use the mechanical simulation model to determine the lateral strain acting on the grating under applied pressure, as seen in FIG. 19C. Since the Young's modulus of TiO$_2$ (approximately 282 GPa) is very high compared to that of PDMS, the width of the TiO$_2$ regions (w in FIG. 16) will be negligibly affected by the forces acting on the grating region; therefore, the observed strain may affect only the grating pitch, while the remaining dimensions of the grating will be effectively unchanged. Thus we can apply the strain results seen in FIG. 19C directly to the pitch, Λ, in the optical simulation models. FIG. 20 illustrates these compound simulation results, with applied pressure linked directly to the resulting reflection spectra of the grating. The relationship of these models to the experimental results obtained from the finished sensor device will be examined in Results section below.

Device Fabrication

A number of challenges arise when attempting to fabricate on a thin, elastic material such as the PDMS membrane present in this embodiment. The inherent fragility of such a structure may severely limit the processes available in the fabrication sequence, and create a number of material compatibility concerns with every additional step. Moreover, handling the delicate membrane throughout processing presents a myriad of opportunities for fabrication defects and device damage. In order to bypass these complications, the sensor device may be first fully fabricated on a rigid substrate, and then released from the substrate in its completed form as a final step.

Since the substrate is not a component of the final sensor device, any compatible material may be used. Silicon may be chosen as the substrate material in this embodiment due to its ready availability and compatibility with a wide array of fabrication processes. A 100 nm thin film of molybdenum (Mo) may be deposited on the silicon wafer to serve as a sacrificial layer, facilitating the eventual release of the grating structure from its rigid substrate.

A 160 nm thick layer of TiO$_2$, which will eventually be patterned into grating lines, may be deposited via sputtering. Due to the sub-micron feature size of the grating, electron-beam lithography (EBL) is chosen to create this pattern. To allow for the EBL process, 30 nm of aluminum (Al) may be evaporated directly on top of the TiO$_2$. This Al film serves as a conduction layer, allowing a discharge path for electrons in order to prevent the dielectric layer from accumulating a charge during EBL. Poly(methylmethacrylate) (PMMA), a positive e-beam resist, may be then spin-coated on the wafer and baked. The PMMA may be then exposed over an area of 750 by 750 μm, forming an inverted image of the desired grating lines. A 50 nm thick chromium (Cr) hard mask may be then created by the lift-off process, and the resulting pattern transferred into both the Al conduction layer and the TiO$_2$ film by reactive ion etching.

At this point, the Cr hard mask may not be easily removed directly due to the fact that Cr wet etchant attacks Mo. Instead, an Al wet etchant may be used to remove the remaining Al underlying the Cr, thereby removing both metals in one step. This may clear the tops of the TiO$_2$ grating lines of metals, preparing the grating to be embedded in the membrane.

To form the pressure sensing membrane, PDMS may be spin-coated over the grating, followed by an hour in a vacuum chamber to ensure adhesion between the grating lines and PDMS. After this, the PDMS may be cured and bonded to a bulk PDMS channel structure. Finally, the device may be immersed in hydrogen peroxide (30%) to etch away the Mo sacrificial layer, releasing the finished device from the substrate.

Figure 21:
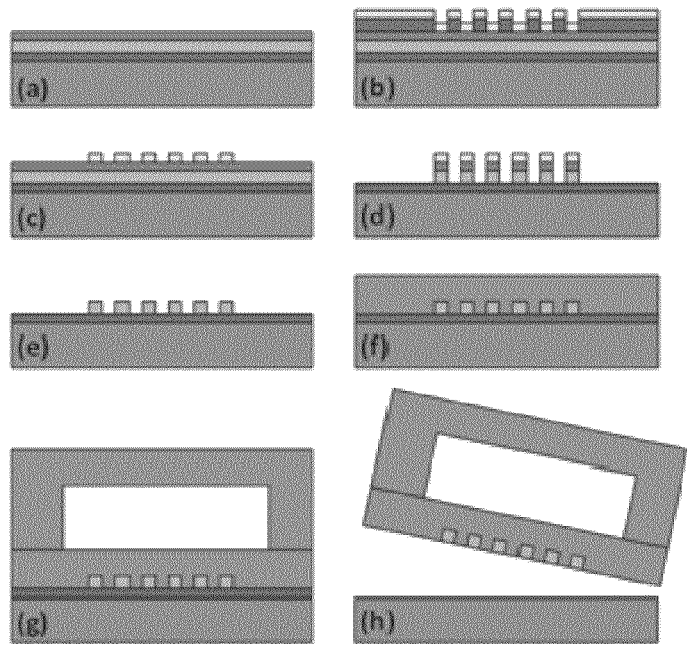
FIG. 21 illustrates a diagram of the major steps in a fabrication process according to an illustrative embodiment.

Fabrication diagrams of the major steps in this process are given in FIG. 21. Scanning electron microscope (SEM) images of the grating structure prior to release from the substrate are shown in FIGS. 22A and 22B, and the final sensor device is illustrated in FIG. 22C.

Experimental Procedure and Results

To characterize the pressure sensor, a syringe pump may be connected to the air inlet of the device to control the applied pressure, and a Baratron® digital manometer may be used to verify the internal pressure of the system. The grating is illuminated by a halogen light source via a reflectance probe, with light from the probe collimated and TM polarized before reaching the device. The light reflected by the grating at various applied pressures may be collected via the reflectance probe and analyzed by a spectrometer.

Some of the resulting reflectance spectra from this characterization are given in FIG. 23. As predicted, there may be a clear shift to higher resonant wavelengths as pressure is applied to the grating. By comparing this data to the simulation in FIG. 20, it may be clear by inspection that that the FEM simulated spectra more closely resemble the experimentally obtained spectra than do the RCWA simulated spectra. In particular, both of the FEM and experimental spectra feature a small local maximum in reflectivity at a wavelength roughly 30 nm below the primary resonance, a feature absent in the RCWA spectra. This result is not surprising; RCWA is a simplified diffraction model, whereas electromagnetic FEM simulation is a full-field solution to Maxwell's equations.

It is worth noting that some attenuation of the resonance peaks is observed in the experimental data which is not present in the simulation results. This could be due to a number of factors which were neglected in the simulations: out-of-plane displacement, membrane curvature, a slight strain gradient across the area of the grating, and angling of the grating due to misalignment with the center of the channel are all factors which may potentially decrease the response of the grating as pressure is increased. Attenuation was not severe enough to inhibit the performance of the device throughout the tested range of pressures, however.

FIG. 24A illustrates the relative shift in the resonant wavelength as pressure is varied from 0 to 20 Torr at a 0.2 Torr intervals, demonstrating an average sensitivity of around 0.88 nm/Torr. The results show good agreement between experimental and simulation results, although the simulation data predicts a higher sensitivity at low applied pressures than was observed. FIG. 24B shows the sensor's response as applied pressures were slowly increased and decreased over a period of several hours. Recordings were made every 2 Torr over an applied pressure range of 60 Torr; over this range, the sensor was found to exhibit an average sensitivity of 0.70 nm/Torr. Sensor readings remained stable over time, and no discernible hysteresis was observed over this pressure range.

Thus, this illustrative embodiment of a guided-mode resonance-based pressure sensor comprising a diffraction grating embedded at the surface of a thin, flexible membrane, shows a response to much lower variations in pressure than most microfluidic pressure sensors. In addition to high sensitivity, the sensor also exhibits negligible hysteresis under increasing and decreasing applied pressures. These qualities make the GMR-based pressure sensor a promising candidate for future microfluidic research. Such a device may easily be implemented in applications which may require the ability to accurately monitor small variations in local pressure or flow rate within a microchannel.

Another illustrative embodiment of the disclosure provides a high-resolution biaxial strain sensor based on guided-mode resonance (GMR) in a two-dimensional, asymmetric titanium dioxide ($TiO_2$) nanograting embedded at the surface of a polydimethylsiloxane (PDMS) slab. While a number of strain measurement techniques have been developed in the past few decades, few are able to follow the surface deformations of relatively soft materials, such as polymers and biomaterials. The highly-compliant strain sensing technique in this 2D GMR sensor embodiment relies on the shifting of the reflected resonant wavelengths, demonstrating a sensitivity of 4.8 nm/%∈, which may be detected accurately by a high resolution spectrometer, thus providing exceptionally accurate strain measurements. As many commercially available spectrometers have a resolution as low as 0.01 nm, such a sensor device may potentially exceed the performance of established highly-compliant strain sensing techniques such as digital image correlation (DIC), at a fraction of the complexity.

Figure 26:
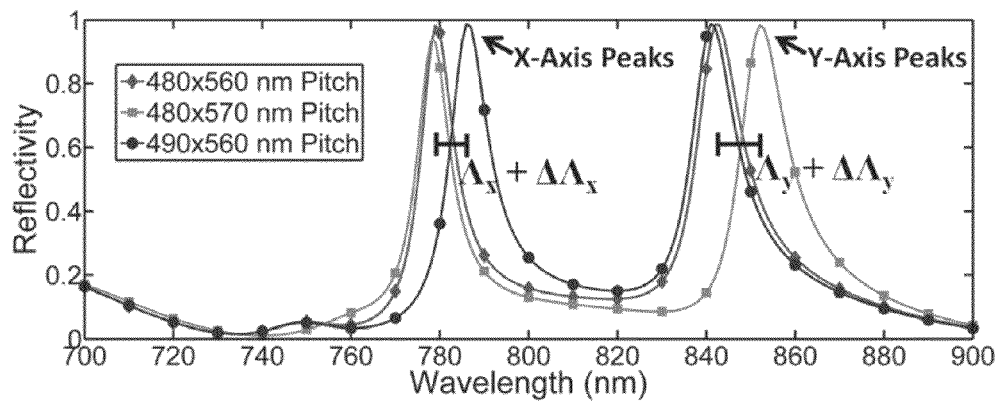
FIG. 26 illustrates distinct peaks in reflectivity which may be resolved simultaneously from a single spectrum according to an illustrative embodiment.

While high-sensitivity 1D strain sensing has been previously accomplished using a GMR sensor, there has been no such prior demonstration for a 2D device. This is due to the use brittle high RI materials in the design of GMR devices (such as $TiO_2$ and $Si_xN_y$), necessitating a conventional 2D GMR structure to be fabricated on a rigid substrate. By embedding a periodic array of high-refractive index (n=2.3) $TiO_2$ pillars at the surface of a low RI (n=1.4) PDMS slab (FIG. 1(a)), guided-mode resonance may be achieved while still maintaining the high-compliance of PDMS. Due to the arrangement of these $TiO_2$ pillars into a rectangular array with a unique pitch along each axis as shown in FIG. 25, light may diffract and interact differently along each axis of the grating, producing two distinct peaks in reflectivity which may be resolved simultaneously from a single spectrum, as illustrated in FIG. 26.

Figure 27:
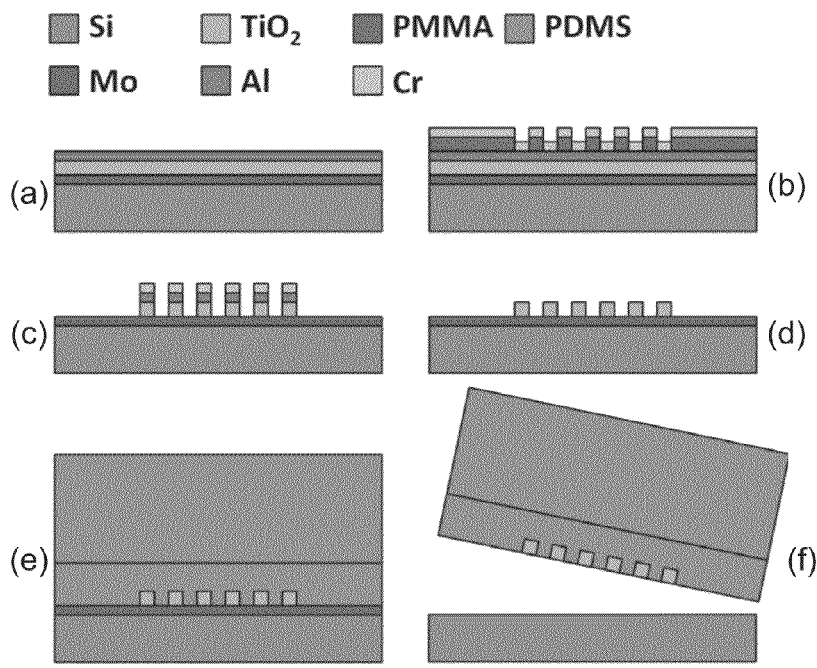
FIG. 27 illustrates a fabrication sequence for a sensor embodiment according to an illustrative embodiment.
Figure 28:
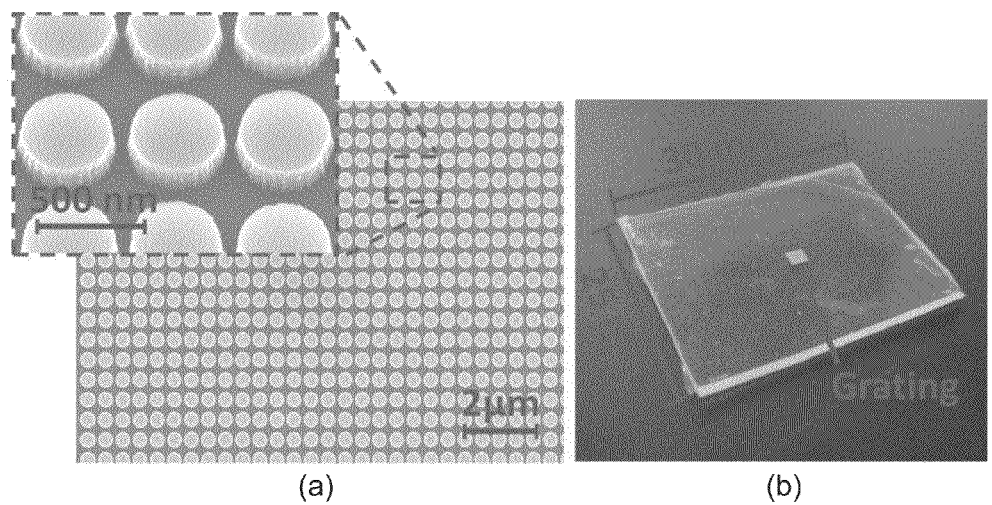
FIG. 28A is a scanning electron microscope image of a two-dimensional array of titanium dioxide grating structures prior to release from the substrate according to an illustrative embodiment.
FIG. 28B is a photograph of a completed two-dimensional grating device according to an illustrative embodiment.

One fabrication sequence for this sensor embodiment is illustrated in FIG. 27. The $TiO_2$ may be initially patterned on a Si substrate by electron-beam lithography (EBL), utilizing a film of molybdenum (Mo) under the $TiO_2$ as a sacrificial layer shown in FIG. 28A. PDMS may be spin-coated and cured on the wafer to embed the $TiO_2$ and bonded to the bulk PDMS slab before wet-etching the Mo film to release the final device as illustrated in FIG. 28B.

Figure 29:
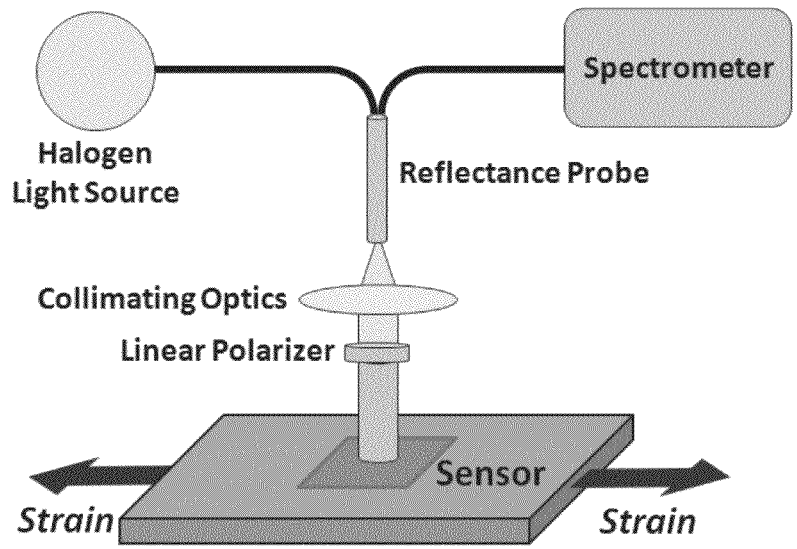
FIG. 29 illustrates a simple reflectance-probe setup according to an illustrative embodiment.

This embodiment of the sensor device may be characterized using a simple reflectance-probe setup, as shown in FIG. 29. FIGS. 30A and 30B show the response of the sensor device's reflectance spectrum when positively strained in the y-axis (long axis), and x-axis (short axis) respectively. In both cases, a shift of the corresponding reflectance peak to a higher wavelength is observed, as well as an opposite wavelength shift in the other peak due to the Poisson effect. FIG. 31 illustrates the relative shifts in these peak wavelengths. In particular, the y-axis peak shows a remarkable sensitivity, while the x-axis shift is somewhat smaller. This is likely due to the high density of the stiff $TiO_2$ in the x-axis direction, which may be alleviated by modifying the grating's geometry.

The 2D GMR sensor allows simultaneous measurements of strains along two independent axes in a region of uniform deformation, thus allowing measurements of two independent viscoelastic functions—uniaxial relaxation function and Poisson function. The sensor can be readily used on all surfaces, whether they are stiff or soft, thus opening up a wide range of applications.

One-Dimensional Guided-Mode Resonance Pressure Sensor

Sensitivity and Comparison to Commercial Sensors

In one embodiment of the pressure sensor device described above, the sensor device was found to be accurate to 0.2 Torr over a range of 60 Torr. A higher accuracy was not characterized at that time, since this was the resolution of the pressure sensor being used to validate the results. However, this sensor exhibited an average sensitivity of 0.7 nm/Torr (the average shift in peak reflective wavelength as pressure is varied); since nearly all commercial near-infrared spectrometers have a resolution in excess of 0.1 nm, it is a very safe assumption that that the device being tested was capable of a higher resolution than 0.2 Torr. For the purposes of this analysis, however, only the data acquired at this time is considered.

MKS, the current industry leader in commercial pressure sensors (manometers), produces a large number of sensors (Baratron®) that operate in this range at an extremely high resolution, but they are ill-suited to local pressure measurements in small-scale systems (such as microfluidic applications) due to their large size. Introducing the sensors to a small pressure system would too greatly impact the characteristics of the system being characterized.

As previously disclosed, an overview of comparable "microfluid scale" (i.e., extremely compact) pressure sensing technologies is provided. However, these technologies are not necessarily commercial technologies. Several commercial Micro-Electro-Mechanical Systems (MEMS) pressure sensors are on the market from such companies as General Electric, ST Microelectronics, and Freescale Semiconductor. GE offers a very broad range of sensors, a few of which operate in a range comparable to our sensor. One such example exhibits a range of around 51 Torr with a typical accuracy within 0.25 Torr (guaranteed accuracy is around 0.75 Torr, however). Freescale Semiconductor does not appear to offer any sensors which operate with a comparable range; most of their sensors operate over a broader range a much lower resolution. ST Microelectronics offers only one pressure sensor, which senses positive pressures up to 185 Torr to a claimed accuracy of 0.15 Torr.

Potential Applications and Advantageous Scenarios

One distinct advantage the illustrative embodiments have over all of these technologies is the ability to be integrated into the sidewall of a microfluidic device (such as lab-on-a-chip devices) with minimal modification to the structure, fabrication, or function of the device, particularly since many of these devices are commonly fabricated from PDMS. Such an ability to measure small variations in pressure (and by extension, flow rate) within such small chambers is something to which none of the devices on the market can compare, and something which could have a number of academic and commercial applications.

Another advantage of the illustrative embodiments is that the embodiments represent a passive, non-contact system. No on-board circuitry is necessary for measurement; all measurement electronics are external to the system, and could be isolated from the device itself. This has obvious advantages for its potential implementation in lab-on-a-chip devices, where biological components of the system necessitate a restricted set of allowable materials (once again, PDMS is a common material for such devices, and may be the only material in contact with the interior of the channels in such an implementation).

The illustrative embodiments are also extremely low-cost, setting them apart from a large number of commercial sensors. This, combined with the aforementioned ability to isolate the external electronics from the system (via a fiber-optic probe), could potentially allow the sensor to be used in situations in which device recovery is not an option (e.g. hazardous environments).

Two-Dimensional Guided-Mode Resonance Strain Sensor

Sensitivity and Comparison to Commercial Sensors

There are a large number of strain measurement techniques which can be largely divided into contact and non-contact methods. Contact methods, such as foil strain gauges, offer extremely high sensitivity (a few $\mu\in$, or microstrain), but are generally only usable over a very limited range (a few percent strain, at best, typically much lower). Such methods are typically easy to implement by adhering the device to the component of which you need to measure strain, but the fact that they are relatively stiff prevents their use on soft materials such as polymers and biological tissues, as the presence of the sensor would too significantly impact the total mechanical properties. The inherent stiffness and limited range limit the applications of these contact methods.

Several non-contact methods have been demonstrated. Their accuracy varies considerably, as does their complexity and practicality. Moiré interferometry, for example, is a technique which utilizes two collimated coherent laser beams to measure the deformation of a grating structure adhered to the component being measured. While relatively accurate, this technique requires a controlled laboratory environment to operate and is not well suited to commercial applications. One non-contact technique which has found commercial success is digital image correlation (DIC). Using this technique, images of a pattern on the surface of an object under deformation is analyzed, and these images are compared to determine strain. Using high-quality cameras, this technique has been demonstrated to a maximum resolution of $50\mu\in$.

Sensor has a demonstrated sensitivity of 4.8 nm/% $\in$. Given a resolution of nearly all commercial spectrometers of at least 0.1 nm (typically far greater), this represents a resolution of at least $200\mu\in$ for the sensor device. This is particularly significant since the setup for the sensor device is relatively simple, at a fraction of the complexity of a high-resolution DIC system. This would allow the sensor device to be implemented in field applications (e.g. monitoring of strain on machinery in industrial settings) which many strain sensing techniques cannot handle.

Potential Applications and Advantageous Scenarios

As mentioned previously, the sensor device is highly compliant (Young's modulus of PDMS is around 750 kPa, a very soft rubber), allowing it to follow the deformations of biological tissues and polymers. This allows for a large number of medical applications, as well as industrial applications (strain monitoring on machinery with polymer components, such as belts and gaskets) where foil strain gauges would be useless.

The illustrative embodiments require less overhead than most non-contact methods, both in cost and complexity. This would allow for monitoring of strain over large areas by utilizing a large array of these inexpensive sensors which could be continuously monitored via fiber optic probes.

Figure 32:
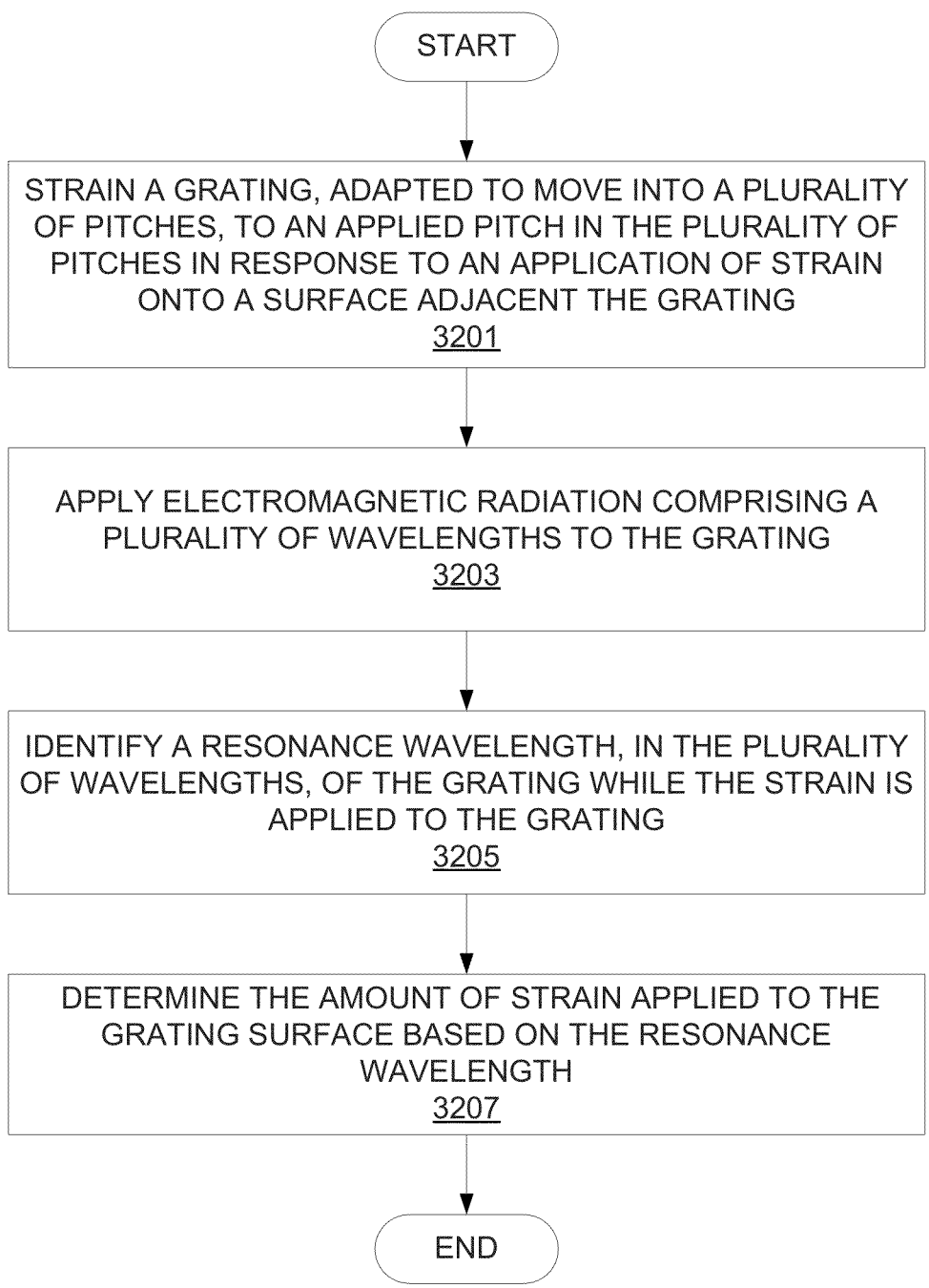
FIG. 32 is a flowchart of a process for determining a pressure applied to a grating according to an illustrative embodiment.

FIG. 32 is a flowchart of a process for determining a pressure applied to a grating according to an illustrative embodiment. The process begins by straining a grating, adapted to move into a plurality of pitches, to an applied pitch in the plurality of pitches in response to an application of pressure onto a surface adjacent the grating (step 3201). The process then applies electromagnetic radiation comprising a plurality of wavelengths to the grating (step 3203). While the pressure is applied to the grating, the process identifies a resonance wavelength, in the plurality of wavelengths, of the grating (step 3205). The process may then determine the amount of pressure applied to the grating surface based on the resonance wavelength (step 3207).

Figure 33:
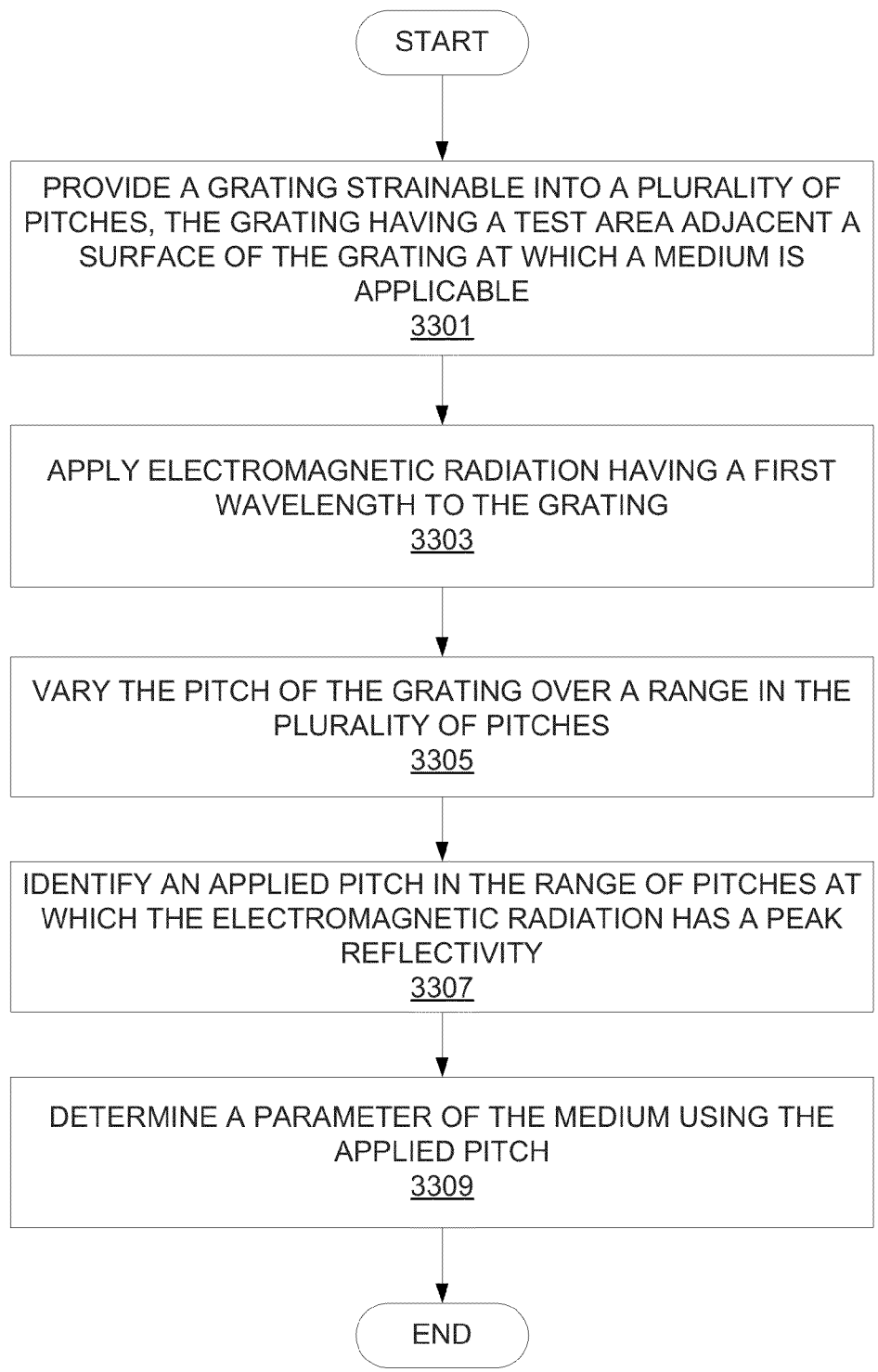
FIG. 33 is a flowchart of a process for determining a parameter of a medium according to an illustrative embodiment.

FIG. 33 is a flowchart of a process for determining a parameter of a medium according to an illustrative embodiment. The process begins by providing a grating strainable into a plurality of pitches, the grating having a test area adjacent a surface of the grating at which a medium is applicable (step 3301). The process then applies electromagnetic radiation having a first wavelength to the grating (step 3303). The pitch of the grating is varied over a range in the plurality of pitches (step 3305). The process identifies an applied pitch in the range of pitches at which the electromagnetic radiation has a peak reflectivity (step 3307). The process may then determine a parameter of the medium using the applied pitch (step 3309).

Figure 34:
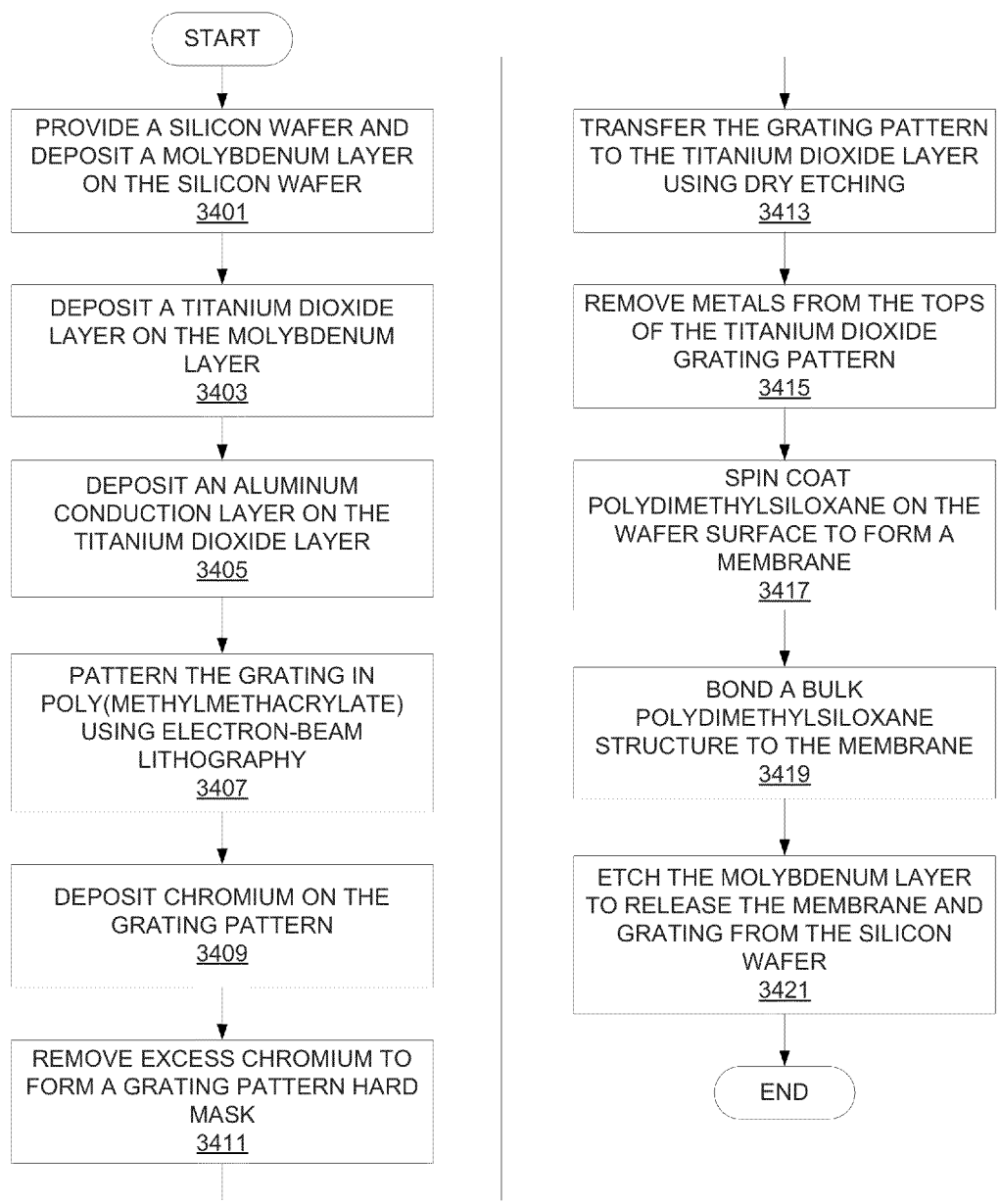
FIG. 34 is a flowchart of a process for manufacturing a grating according to an illustrative embodiment.

FIG. 34 is a flowchart of a process for manufacturing a grating according to an illustrative embodiment. The process begins by providing a silicon wafer and depositing a molybdenum layer on the silicon wafer (step 3401). A titanium dioxide layer is deposited on the molybdenum layer (step 3403), and an aluminum conduction layer is deposited on the titanium dioxide layer (step 3405). The process then patterns the grating in poly(methylmethacrylate) using electron-beam lithography (step 3407). Chromium is then deposited on the grating pattern (step 3409). The process then removes excess chromium to form a grating pattern hard mask (step 3411). The process transfers the grating pattern to the titanium dioxide layer using dry etching (step 3413). Metals are then removed from the tops of the titanium dioxide grating pattern using an aluminum wet etchant (step 3415). The process spin coats polydimethylsiloxane on the wafer surface to form a membrane (step 3417), and then bonds a bulk polydimethylsiloxane structure to the membrane (step 3419). The process then etches the molybdenum layer to release the membrane and grating from the silicon wafer (step 3421).

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment.

What is claimed is:

1. A grating comprising:
    a low refractive index material; and
    a plurality of regions of high refractive index material embedded in the low refractive index material, the plurality of high refractive index material regions spaced such that the grating comprises alternating regions of low refractive index material and high refractive index material;
    wherein the spacing between the high refractive index material regions is adapted to change based on an amount of pressure applied to the grating such that the resonant wavelength of the grating is changeable when pressure is applied to the grating.

2. The grating of claim 1, wherein the low refractive index material is polydimethylsiloxane.

3. The grating of claim 1, wherein the high refractive index material is titanium dioxide.

4. The grating of claim 1, wherein the high refractive index material regions are bar-shaped and parallel to one another, with the bar-shaped high refractive index regions evenly spaced from one another.

5. The grating of claim 1, further comprising: one or more structural walls on one side of the grating forming a cavity adjacent a surface of the grating.

6. The grating of claim 1, wherein the cavity is formed from the low refractive index material.

7. The grating of claim 1, wherein the high refractive index material regions are configured as an array in two dimensions with multiple axes of periodicity, each axis of the array having a pitch such that strain on the grating causes the resonant wavelength associated with each axis of the grating to be affected differently.

8. The grating of claim 1, wherein the grating comprises a binding surface comprising one or more binding sites, the one or more binding sites adapted to bind to one or more particles in a medium adjacent the binding surface of the grating.

\* \* \* \* \*